United States Patent
Mizutani

(10) Patent No.: US 8,128,723 B2
(45) Date of Patent: Mar. 6, 2012

(54) PARTIALLY PLUG-LESS DPF

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/820,599

(22) Filed: Jun. 22, 2010

(65) Prior Publication Data

US 2010/0257830 A1  Oct. 14, 2010

Related U.S. Application Data

(63) Continuation of application No. PCT/JP2008/073544, filed on Dec. 25, 2008.

(30) Foreign Application Priority Data

Dec. 27, 2007 (JP) .................. 2007-337532

(51) Int. Cl.
*B01D 39/14* (2006.01)

(52) U.S. Cl. ........ 55/523; 55/DIG. 5; 264/628; 264/630

(58) Field of Classification Search ............ 55/522–524; 422/169–172, 177–182; 60/297
See application file for complete search history.

(56) References Cited

U.S. PATENT DOCUMENTS

| | | | | |
|---|---|---|---|---|
| 4,420,316 A * | 12/1983 | Frost et al. | ...................... | 55/523 |
| 4,428,758 A * | 1/1984 | Montierth | ...................... | 55/523 |
| 4,464,185 A | 8/1984 | Tomita et al. | | |
| 4,568,402 A * | 2/1986 | Ogawa et al. | .............. | 156/89.22 |
| 6,669,751 B1 * | 12/2003 | Ohno et al. | ...................... | 55/523 |
| 6,673,414 B2 * | 1/2004 | Ketcham et al. | .............. | 428/116 |
| 6,811,737 B2 * | 11/2004 | Fukuta et al. | ................. | 264/482 |
| 7,052,532 B1 * | 5/2006 | Liu et al. | ......................... | 96/154 |
| 7,101,601 B2 * | 9/2006 | Ishihara et al. | .............. | 428/116 |
| 7,326,271 B2 * | 2/2008 | Kasai et al. | ...................... | 55/523 |
| 7,611,560 B2 * | 11/2009 | Ichikawa | ......................... | 55/523 |
| 7,806,956 B2 * | 10/2010 | Anderson et al. | .............. | 55/523 |
| 7,867,598 B2 * | 1/2011 | Miyairi et al. | ................. | 428/116 |

(Continued)

FOREIGN PATENT DOCUMENTS

EP  0 036 321 A1  9/1981

(Continued)

OTHER PUBLICATIONS

Ohtsubo, English translation of WO 2007/094499, Aug. 23, 2007.*

(Continued)

*Primary Examiner* — Duane Smith
*Assistant Examiner* — Amber Orlando
(74) *Attorney, Agent, or Firm* — Oliff & Berridge, PLC

(57) ABSTRACT

There is provided a ceramic filter capable of controlling extraordinary rise of the internal temperature upon regeneration by reducing an amount of deposited soot (particulates) by increasing a passage flow rate in the through-cells and realizing improvement of the regeneration limit and correspondence of PM emission and a method for manufacturing a ceramic filter. A plurality of through channels 7 are formed in the honeycomb segment 2, and the cells are constituted as inlets and/or outlets of the through channels 7 and contain a plurality of honeycomb segments 2 bonded to one another. Each honeycomb segment 2 includes a first inflow port 8, a second inflow port 9, and as a part at least through-cells 10 formed to extend there through in such a manner that fluid can be discharged from the inlet to the outlet of the cells without being plugged at the inlet and the outlet of the cell.

18 Claims, 12 Drawing Sheets

U.S. PATENT DOCUMENTS

| | | | |
|---|---|---|---|
| 2002/0078667 A1 | 6/2002 | Ishihara et al. | |
| 2002/0090324 A1* | 7/2002 | Badeau et al. | 422/171 |
| 2003/0093982 A1* | 5/2003 | Suwabe et al. | 55/523 |
| 2003/0097834 A1* | 5/2003 | Gabe et al. | 60/297 |
| 2004/0068971 A1 | 4/2004 | Kuki et al. | |
| 2004/0131772 A1* | 7/2004 | Yamada et al. | 427/230 |
| 2004/0161373 A1* | 8/2004 | Ichikawa et al. | 422/180 |
| 2004/0258582 A1* | 12/2004 | Miwa et al. | 422/177 |
| 2005/0210848 A1* | 9/2005 | Kuki et al. | 55/523 |
| 2005/0274096 A1 | 12/2005 | Yamada et al. | |
| 2006/0068159 A1 | 3/2006 | Komori et al. | |
| 2007/0051081 A1* | 3/2007 | Mizutani | 55/523 |
| 2007/0231539 A1 | 10/2007 | Miyairi et al. | |
| 2008/0110341 A1* | 5/2008 | Ketcham et al. | 95/274 |
| 2008/0155952 A1* | 7/2008 | Okazaki et al. | 55/523 |

FOREIGN PATENT DOCUMENTS

| | | |
|---|---|---|
| JP | A-56-129020 | 10/1981 |
| JP | A-57-201518 | 12/1982 |
| JP | A-58-70814 | 4/1983 |
| JP | A-60-3420 | 1/1985 |
| JP | U-61-149714 | 9/1986 |
| JP | A-2002-256842 | 9/2002 |
| JP | A-2003-307114 | 10/2003 |
| JP | A-2004-130229 | 4/2004 |
| JP | A-2004-154647 | 6/2004 |
| JP | A-2005-349269 | 12/2005 |
| JP | B2-3874258 | 1/2007 |
| JP | A-2007-289926 | 11/2007 |
| WO | WO 2004/113252 A1 | 12/2004 |
| WO | WO 2007/094499 A1 | 8/2007 |

OTHER PUBLICATIONS

Hiroshige Mizuno et al., "Effect of Cell Structure on Regeneration Failure of Ceramic Honeycomb Diesel Particulate Filter," SAE Technical Series, 1983, pp. 9-15.

International Search Report issued in Patent Application No. PCT/JP2008/073544, on Apr. 21, 2009 (with translation).

* cited by examiner

10A

10B

10B

FIG.8A      10C
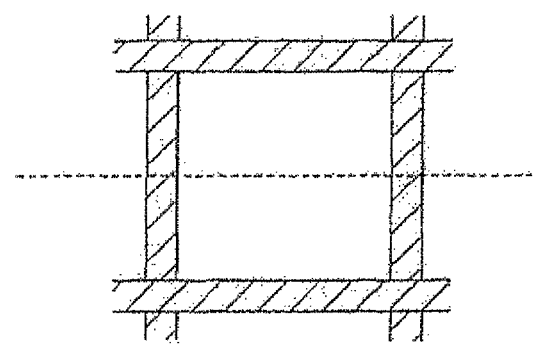
FIG.8B      10C
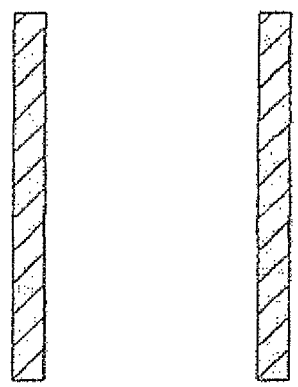

PARTIALLY PLUG-LESS DPF

This is a Continuation of International Patent Application No. PCT/JP2008/073544 filed Dec. 25, 2008, which claims the benefit of Japanese Patent Application No. 2007-337532 filed Dec. 27, 2007. The disclosure of the prior application is hereby incorporated by reference herein in its entirety.

TECHNICAL FIELD

The present invention relates to a ceramic filter used for a DPF (diesel particulate filter) and other trapping filters. The filter traps and removes particulate matter (particulates) such as soot (soot) contained in exhaust gas from a diesel engine or the like.

BACKGROUND ART

A DPF is described in JP-A-56-129020. After a plurality of porous honeycomb segments made of ceramic such as silicon carbide are bonded together by means of a bonding layer of segments, the periphery is covered with a coating material layer. The DPF is disposed in an exhaust gas system of a diesel engine and used for purifying exhaust gas.

Each of the honeycomb segments in the aforementioned DPF is partitioned by porous partition walls and has a large number of through channels extending through in the axial direction. Adjacent through channels have alternately plugged ends. That is, the through channel is open in one side end portion and plugged in the other side end portion. Another through channel adjacent to the through channel is plugged in the other side end portion and open in the one side end portion.

In the DPF having such a structure, exhaust gas flows in from the open end portion of through channels, passes through the porous partition walls, and discharged from the other through channels. When the exhaust gas passes through the partition walls, particulate matter typified by soot in exhaust gas is trapped by the partition walls to purify the exhaust gas.

In such a DPF, by continuous purification of exhaust gas, soot deposits in the through channels, and pressure loss increases with the lapse of time to decrease purification efficiency. Therefore, it is necessary to perform regeneration, where soot is removed by combustion. It has been known that, by the soot combustion heat upon regeneration, temperature becomes highest in the central portion on the exhaust gas outlet side in each of the honeycomb segments (see the publication "SAE Technical Series 870010" published in February, 1983). During such regeneration of honeycomb segments, the maximum temperature on the outlet side becomes durable temperature or more of the honeycomb segments to cause problems of crack generation in a honeycomb segment and/or deterioration of a loaded catalyst.

Above all, a DPF having a segment structure has a problem in controlling the maximum temperature upon regeneration. That is, since, in a DPF having a segment structure, soot is not deposited in the bonding portion, and the bonding portion has low thermal conductivity and high thermal capacity, as shown in FIGS. 9A to 9C, the outer peripheral portion of the segment 102 has low temperature to form a heat spot in the center of the segment 102. Therefore, the peculiar temperature distribution may cause deformation due to thermal expansion in the outlet end face of a segment and/or application of tensile stress to cause a problem of easy crack generation in the outlet end face.

By the way, a trial of solving the aforementioned problems has conventionally been made, such as adjustment of temperature so that the inlet temperature of a DPF upon regeneration is in a certain level or less, controlling the oxygen temperature in air supplied and/or the flow rate of the air supplied upon regeneration, and adjustment of regeneration timing lest the amount of soot deposited in a honeycomb segment should be in a certain level or more. For example, there are the following Patent Documents 2 to 4.

In the Patent Document 2, to solve the problems is tried by arranging a partial plug in the vicinity of opening portion to suppress excessive pressure loss generation and to inhibit a crack or melt due to deposition of particulate matter. However, by the partial plug 99 shown in the Patent Document 2, for example, as shown in FIG. 10, PM is generally deposited to cause clogging in the PM before regeneration, and, inversely, PM density in the vicinity of the partial plug rises to make temperature higher than the ordinary plugging portion upon regeneration. Therefore, the maximum temperature upon regeneration cannot be suppressed sufficiently, and it does not serve as a sufficient countermeasure against the problems of a deformation due to thermal expansion of the segment and easily crack generation. Above all, as to the problem caused by the peculiar temperature and stress distributions because of the aforementioned segment structure, the Patent Document 2 discloses no technical concept regarding how to control the peculiar temperature and stress distributions which may be caused in each segment because of unitary formation is shown, and the problems have not been solved.

The Patent Document 3 discloses a structure where at least part of the plugging portions have a through-hole formed therein, which seems to have an effect to some extent. However, the trapping efficiency is prone to vary due to deposition of particulate matter, and the Patent Document 3 shows a unitarily formed honeycomb structure. Therefore, it is not sufficient for the problems of the DPFs having a segment structure.

In the Patent Document 4, a plurality of honeycomb-shaped carrier substrates each having a plurality of cells extending in almost parallel with the axial direction are arranged in series in the exhaust gas flow passage to constitute an exhaust gas purification apparatus. In this constitution where two or more substrates are arranged in series, as the regeneration is repeated, the PM deposited in a downtown DPF cannot be combusted completely to make pressure loss very high, and extraordinary combustion may be caused in the downstream DPF upon regeneration after repetition. Thus, the problems have not been solved.

As described above, none of the Patent Documents 1 to 4 shows a sufficient countermeasure against the problems caused upon regeneration of a honeycomb segment, above all, the problems upon regeneration in a segment structure, and further improvement is required.

Patent Document 1: JP-A-56-129020
Patent Document 2: JP-A-2002-256842
Patent Document 3: JP-A-2004-130229
Patent Document 4: JP-B-3874258
Non-Patent Document 1: Publication "SAE Technical Series 870010"

DISCLOSURE OF THE INVENTION

The present invention has been made to solve the aforementioned problems and provides a ceramic filter capable of controlling extraordinary temperature rise in inside portion upon regeneration by reducing the amount of soot (amount of particulate matter) deposited by raising the passage flow rate in the through-cells by arranging through-cells having the unplugged inlet and outlet cells in a plurality of through channels provided in the honeycomb segment formed of a plurality of cells and capable of realizing both the improvement in regeneration limit and the response to PM emission, and a method for manufacturing a ceramic filter.

According to the present invention, there is provided the following DPF.

[1] A ceramic filter comprising a plurality of honeycomb segments bonded to one another; said segments each being partitioned by porous partition walls and formed of a plurality of cells, where a plurality of through channels functioning as exhaust gas flow passages are formed in a longitudinal direction of each of the honeycomb segments, and the cells are constituted as inlets and/or outlets of the through channels functioning as the exhaust gas flow passages; wherein each of the honeycomb segments includes a first inflow port plugged at the inlet of the cell and open at the outlet of the cell and a second inflow port open at the inlet of the cell and plugged at the outlet of the cell; and further at least partially contains through-cells formed to extend there through without being plugged at the inlet and the outlet of the cell so that a fluid can be discharged from the inlet to the outlet of the cells.

[2] A ceramic filter according to [1], wherein the through-cells are formed in a large amount in a honeycomb segment disposed in a central portion of the ceramic filter.

[3] A ceramic filter according to [1] or [2], wherein the through-cells are formed in a large amount in a honeycomb segment located in an inner peripheral portion other than the segments located in an outer peripheral portion of the ceramic filter.

[4] A ceramic filter according to any one of [1] to [3], wherein the through-cells are formed in a regular manner pattern.

[5] A ceramic filter according to any one of [1] to [3], wherein the through-cells are formed in an irregular manner pattern.

[6] A ceramic filter according to any one of [1] to [5], wherein the cells further include a both end-plugged cell plugged at both the ends.

[7] A ceramic filter according to any one of [1] to [6], wherein the through-cells are formed with being plugged at neither of the ends at inlet and outlet.

[8] A ceramic filter according to any one of [1] to [7], wherein the through-cell are plugged at both the ends or in one end portion, and a small through-hole passing through a part of both the ends or the one end portion plugged is formed.

[9] A ceramic filter according to [7] or [8], wherein the opening area of the through-cells is 20 to 100% with respect to the opening area of the cells without being plugged.

[10] A ceramic filter according to any one of [1] to [9], wherein the cells are formed so that a cross-sectional shape on the inlet side is different from a cross-sectional shape on the outlet side.

[11] A ceramic filter according to [10], wherein the cross-sectional shape on the inlet side of the cell is octagonal, and the cross-sectional shape on the outlet side of the cell is quadrangular.

[12] A ceramic filter according to any one of [1] to [11], wherein the plugging is formed in a checkerwise pattern, then a part of the plugging is constituted as a through-cell.

[13] A ceramic filter according to [12], wherein a part of cells having the plugging formed in a checkerwise pattern includes at least a both end-plugged cell.

[14] A ceramic filter according to any one of [1] to [13], wherein the through-cells share 2 to 40% of the whole cells in number.

[15] A method for manufacturing a ceramic filter, wherein a hole is made in each of portions where cells other than the through-cells are formed in a film by a laser in a step of applying a film and making holes thereon by a laser and a plugging paste is stuffed in a step of forming the plugging in end portions of the through channels upon manufacturing a ceramic filter according to any one of [1] to [14].

[16] A method for manufacturing a ceramic filter according to [15], wherein the plugging paste is stuffed only in portions, while a plug-less portion is formed without making holes in the film by a laser, where the holes are formed by laser at the step of applying a film, making holes by a laser in a checkerwise pattern to form the plugging portions in the through channels.

[17] A method for manufacturing a ceramic filter, wherein the through-cells are formed by forming through-holes in the plugging after the plugging is formed in a step of forming the through-cells upon manufacturing a ceramic filter according to any one of [1] to [14].

[18] A method for manufacturing a ceramic filter according to [17], wherein through-cells are formed by providing through-holes after the plugging is formed in a checkerwise pattern in a manufacturing method for forming the through-cells.

[19] A method for manufacturing a ceramic filter, where the through-cells are formed by boring a part of the plugging after the plugging is formed in a step of manufacturing the through-cells upon manufacturing a ceramic filter according to any one of [1] to [14].

[20] A method for manufacturing a ceramic filter according to [19], wherein the through-cells are formed by boring a part of the plugging after the plugging is formed in a checkerwise pattern in a manufacturing method for forming the through-cells.

According to the present invention, there is exhibited excellent effects capable of providing a ceramic filter capable of controlling extraordinary temperature rise in the inside portion upon regeneration by reducing the amount of soot (amount of particulate matter) deposited by raising the passage flow rate in the through-cells by arranging through-cells having the unplugged inlet and outlet cells in a plurality of through channels provided in the honeycomb segment formed of a plurality of cells and capable of realizing both the improvement in regeneration limit and the response to PM emission and a method for manufacturing a ceramic filter.

BRIEF DESCRIPTION OF THE DRAWINGS

FIG. 8A is a view schematically showing one of the honeycomb segments constituting a ceramic filter where an embodiment of the present invention is applied and view of a through-cell without through-cell-plugging and partially enlarged plan view viewed from an end face side of the honeycomb segment.

FIG. 8B is a view schematically showing one of the honeycomb segments constituting a ceramic filter where an embodiment of the present invention is applied and partially enlarged plan view obtained by cutting the through-cell of FIG. 8A along the axial direction (longitudinal direction) of the honeycomb segment.

DESCRIPTION OF REFERENCE NUMERALS

1: ceramic filter, 2: honeycomb segment, 3: honeycomb, 4: coating agent layer, 5: cell, 6: porous partition wall, 7: through channel, 8: first through channel, 9: second through channel, 10, 10A, 10B, 10C: through-cell, 11: plugging, 99: partial plug, 101: soot, 102: conventional DPF

BEST MODE FOR CARRYING OUT THE INVENTION

Hereinbelow, the best mode for carrying out a ceramic filter of the present invention will specifically be described. However, the present invention widely includes ceramic filters provided with the matters specifying the invention and is not limited to the following embodiment.

Figure 1:
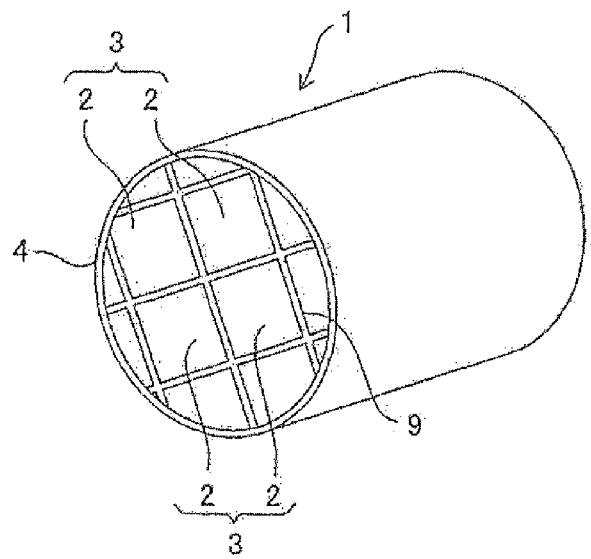
FIG. 1 is a schematic view showing a ceramic filter where an embodiment of the present invention is applied and perspective view of the ceramic filter.
Figure 2:
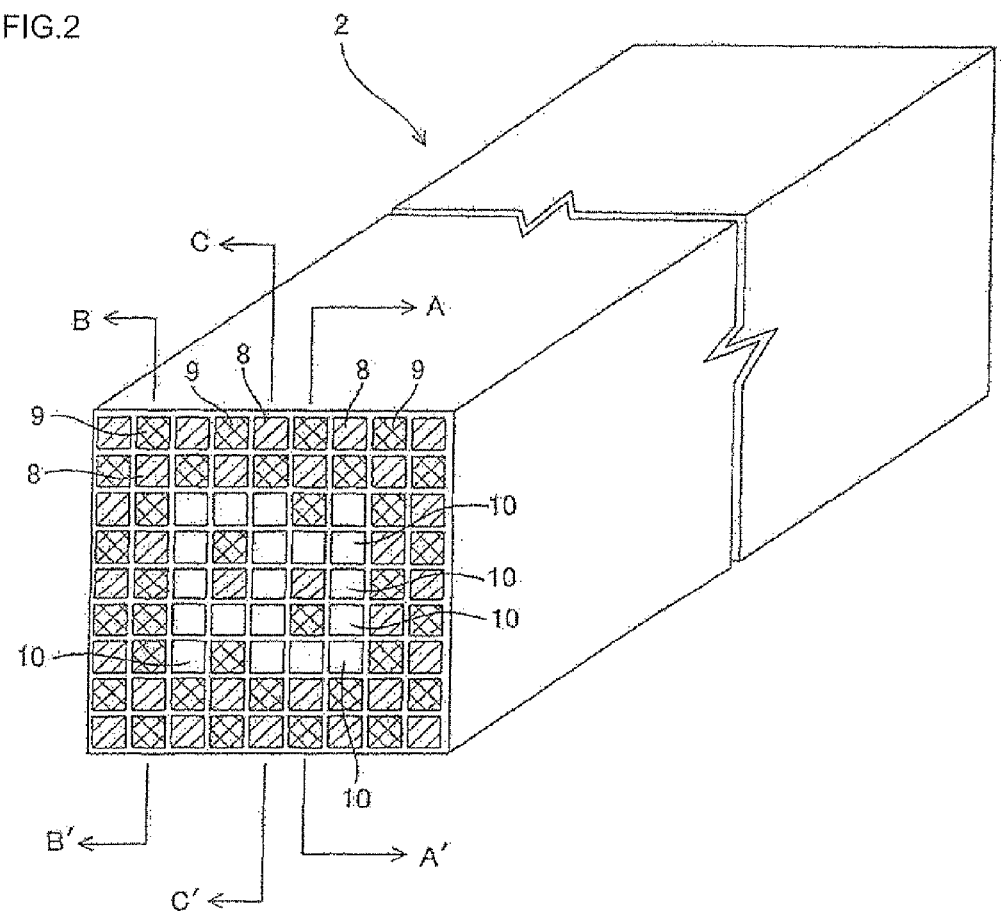
FIG. 2 is a schematic view showing one of the honeycomb segments constituting a ceramic filter where an embodiment of the present invention is applied and perspective view of the honeycomb segment.

[1] Constitution of a Ceramic Filter of the Present Invention:

As shown in FIGS. 1 to 3, a ceramic filter 1 of the present invention includes a plurality of honeycomb segments 2 bonded to one another; said segments being partitioned by porous partition walls 6 and formed of a plurality of cells, where a plurality of through channels 7 functioning as exhaust gas flow passages are formed in a longitudinal direction of each of the honeycomb segments 2, and the cells are constituted as inlets and/or outlets of the through channels 7 functioning as the exhaust gas flow passages. Each of the honeycomb segments 2 contains the first inflow port 8 plugged at the inlet of the cell and open at the outlet of the cell and the second inflow port 9 open at the inlet of the cell and plugged at the outlet of the cell. Further, the honeycomb segment 2 at least partially contains through-cells 10 formed to extend through so that a fluid can be discharged from the inlet to the outlet of the cells without being plugged at the inlet and the outlet of the cell.

Specifically, as shown in FIG. 1, a ceramic filter 1 includes a columnar honeycomb 3 and a coating agent layer 4 disposed in the periphery of the honeycomb 3. The honeycomb 3 includes a plurality of honeycomb segments 2 bonded to one another. The honeycomb segments 2 are bonded together by means of a bonding layer 9. After the honeycomb segments 2 are bonded, the honeycomb 3 is subjected to grinding processing in the outer peripheral portion thereof to obtain a circular cross section, an elliptic cross section, a triangle cross section, or another cross section. The periphery of the honeycomb 3 is coated with a coating agent layer 4 to form a ceramic filter 1. The ceramic as a DPF is disposed in an exhaust gas flow passage of diesel engine to trap particulate matter containing soot discharged from a diesel engine.

[1-1] Honeycomb Segment:

As shown in FIGS. 1 and 2, the honeycomb segments 2 are bonded with one another by means of a bonding material (bonding material layer 4) to constitute the ceramic filter 1 of the present embodiment. Each of the honeycomb segments 2 is partitioned by porous partition walls 6 and further formed of plurality of cells. In addition, a plurality of through channels 7 functioning as exhaust gas flow passages are formed in the longitudinal direction of each of the honeycomb segments 2. The cells are constituted as inlets and/or outlets of the aforementioned through channels 7 functioning as exhaust gas flow passages. The through channels 7 which the honeycomb segment is provided with are constituted of basically the first inflow ports 8 each having a plugged inlet cell and in open outlet cell, the second inflow ports 9 each having an open inlet cell and a plugged outlet cell, and through-cells each having an unplugged inlet cell and an unplugged outlet cell.

Incidentally, it is preferable that the number of the honeycomb segments combined together is suitably selected as necessary.

[1-1-1] Through Channel:

The through channels 7 are constituted of the first inflow ports 8, the second inflow ports 9, and the through-cells 10.

[1-1-1-1] The First Inflow Port and the Second Inflow Port:

As shown in FIGS. 2, 3A, 3B, and 3C, the first inflow ports 8 are plugged at the inlet and open at the outlet. In addition, the second inflow ports 9 are open at the inlet and plugged at the outlet. Arranging the first inflow ports 8 plugged at the inlet and open at the outlet and the second inflow ports 9 open at the inlet and plugged at the outlet in this manner enables efficient trapping.

Here, it is preferable that the first through channels and the second through channels are mutually adjacently aligned (disposed) for effective trapping of particulate matter (soot) by allowing exhaust gas to flow in and out in the portion where no through-cell is arranged.

When through-cells are arranged, it is preferable to employ an arrangement according to need. Specifically, a through-cell may be provided between the first through channel and the second through channel in the order of the first through channel/the through-cell/the second through channel. Alternatively, the order may be the through-cell/the first through channel/the second through channel/the through-cell or the through-cell/the first through channel/the through-cell/the second through channel/the through-cell. The alignment is not limited to these as long as the temperature rise upon regeneration can be controlled and as long as it can withstand PM emission by combining each rate of the first through channels, the second through channels, and the through-cells.

[1-1-1-2] Through-Cell:

The through-cells which the present embodiment is provided with mean cells formed so as to extend there through in a longitudinal direction (axial direction) of a honeycomb segment in such a manner that exhaust gas can flow in the cells from the inlets of the cells and flow out toward the outlets of the cells. That is, the through-cells are desirably formed to extend there through with the inlet and outlet (both ends) of each of the cells being unplugged unlike the first through channels and the second through channels described above.

When the unplugged through-cells are thus formed, as the so-called blocking walls for blocking the inflow and outflow of the exhaust gas or plugging at the inlet or the outlet, exhaust gas passage flow rate in the through channel increases to reduce the deposited soot amount. Therefore, extraordinary internal temperature rise upon regeneration can be suppressed. As described above, in the DPF of a segment structure, soot is not deposited in the bonding portion, and the bonding portion has a low thermal conductivity and a high thermal capacity. Therefore, the outer peripheral portion of the segment has low temperature, and a heat spot is formed in the center of the segment. By the peculiar temperature distribution, the outlet end face of the segment may be deformed due to thermal expansion or may have tensile stress to cause a problem of easy crack generation in the outlet end face. However, by forming the through-cells, almost all the exhaust gas entered passes through (flows out) from the inlet to the outlet as it is without depositing soot and the like. Moreover, since the flow rate upon passing through is high, temperature rise upon regeneration can be suppressed with the cooling effect generated upon exhaust gas passage. Therefore, the maximum temperature upon regeneration of a DPF having a segment structure can be controlled distinctly easily.

In other words, by forming the through-cells, the first through channels, and second through channels in combination, not only defects due to the peculiar temperature and stress distributions because of the segment structure can be controlled by the joint action of them to improve the regeneration limit in the stage of each honeycomb segment, but also the peculiar defects because of the segment structure can be controlled as a whole in the stage of a honeycomb segment structure formed by combining the honeycomb segments, and the improvement in regeneration limit can be realized as a whole. Therefore, quite delicate control becomes possible.

Figure 3A:
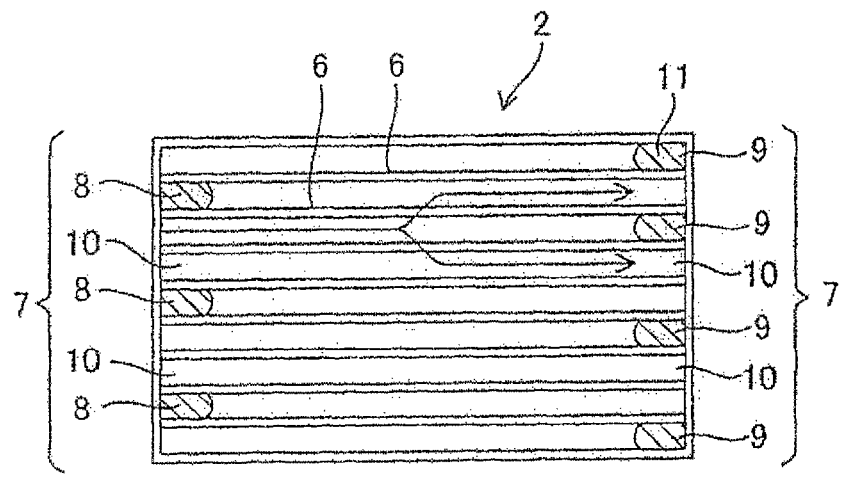
FIG. 3A is a schematic view schematically showing a cross section of the honeycomb segment shown in FIG. 2 and A-A' cross-sectional view shown in FIG. 2.
Figure 3B:
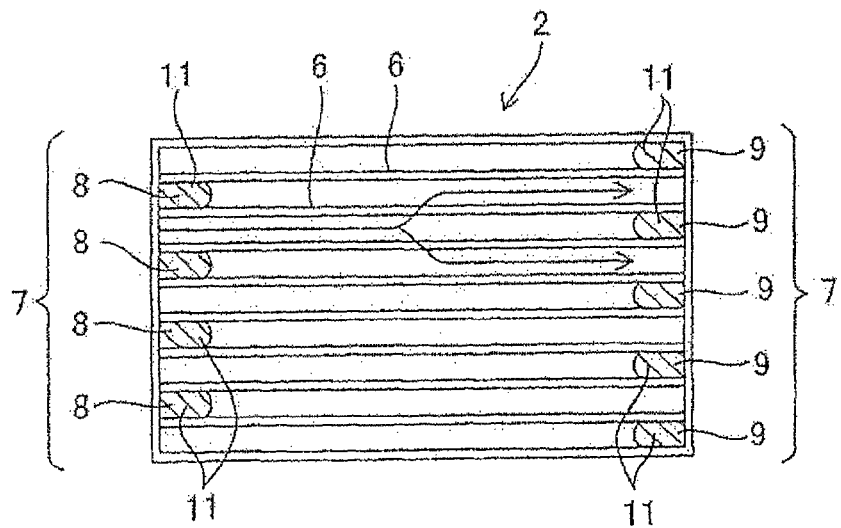
FIG. 3B is a schematic view schematically showing a cross section of the honeycomb segment shown in FIG. 2 and B-B' cross-sectional view shown in FIG. 2.
Figure 3C:
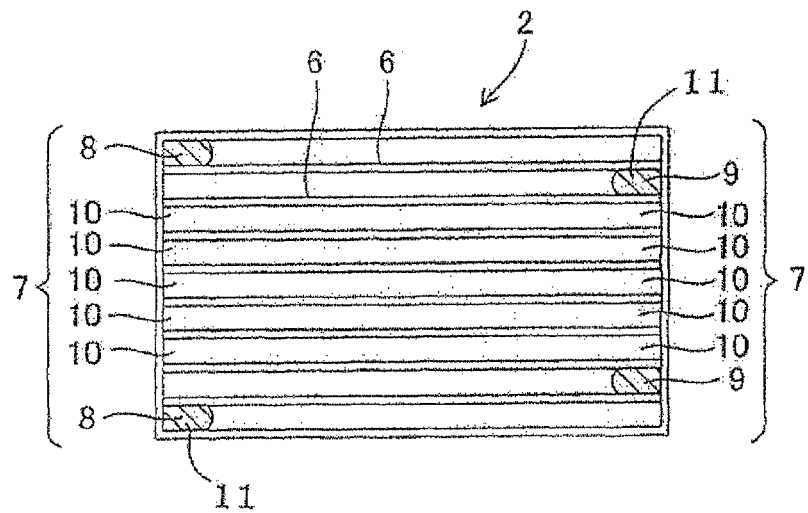
FIG. 3C is a schematic view schematically showing a cross section of the honeycomb segment shown in FIG. 2 and C-C' cross-sectional view shown in FIG. 2.

With referring to FIG. 3C, the through-cell 10 is specifically described. As shown in FIG. 3C, the through-cell 10 is formed in the state that plugging is performed at neither the cell at the inlet nor the cell at the outlet. That is, the exhaust gas entered from the inlet of the through-cell 10 has a high passage flow rate in the through-hole of the through-cell 10 because there is no wall serving as a barrier. Therefore, most of the exhaust gas proceeds as it is toward the outlet and is discharged (moves) outside (to an exhaust gas pipe) from the outlet. In other words, since the passage flow rate in the through-cell is high, particulate matter (soot) in the exhaust gas having entered the though-hole is discharged in the next step (in the exhaust gas pipe) without being deposited in the through-hole. Since no soot serving as a fuel is present upon regeneration, local extraordinary temperature rise due to soot combustion is not caused, and a negative effect such as a crack in the honeycomb segment can be inhibited. Therefore, delicate temperature control in each of the honeycomb segments becomes possible only by providing the through-cell.

Incidentally, the aforementioned "most of the exhaust gas is discharged (moves) as it is" was referred to as "most" because, in deed, a little PM deposits in the through-hole by a function of the aforementioned Brownian diffusion or the like even in the through-cell without being plugged at inlet and outlet. However, even if such Brownian diffusion is caused, since the amount of PM trapped in the through-hole of the through-cell is small in comparison with the through channel having a plugging formed therein, the effect of the present application can be exhibited. In addition, needless to say, the amount of PM discharged without being trapped in the through-cell can be controlled to a desired PM amount by controlling the rate of forming the through-cells in the honeycomb segment to be within a desired range.

Further, the through-cell is formed in such a manner that temperature control (adjustment) in the segment, above all, temperature rise upon regeneration can be controlled by working together with the first through channel and the second through channel. Specifically, as shown in FIGS. 3A to 3C, when a ceramic filter obtained by combining the honeycomb segments together is disposed in an exhaust gas flow passage (not illustrated), the exhaust gas flowing in the inflow port 7 (through hole) from the inlet of the through-cell 10 is discharged from the outlet of the through-cell 10, passes through the porous partition walls 6 of the through-cell 10 by the function of the aforementioned Brownian diffusion or the like to be discharged from the adjacent first through channel 8, or further passes through the porous partition walls 6 to enter the second through channel 9 or another through-hole 10 to be discharged outside from there.

In addition, the exhaust gas flowing in the inflow port 7 (through-hole) from the second through channel 9, for example, flows in through channels of each honeycomb segment from the left end in FIGS. 3A to 3C, moves toward the right side, and may be discharged from the adjacent first through channel 8 or the second through-hole 9 without being discharged from the outlet of the second inflow port 9. That is, this is because the exhaust gas flows in the honeycomb segment from the open through channels without being plugged and is discharged from the unplugged outlets. Incidentally, in FIGS. 3A to 3C, the left end face of the honeycomb segment serves as the exhaust gas inflow side, and the right side end face serves as the outlet side. However, the disposition method is not limited to this one.

Thus, since the honeycomb segment 2 is formed as a water wall type partitioned by porous partition walls, exhaust gas passes through the porous partition walls, moves to other through channels (open on the outlet side), and discharged from the right side end face. Therefore, the exhaust gas falls off by its own weight to be trapped upon passing through the through channel and, in addition, trapped by the partition walls also upon passing the aforementioned partition walls to be purified.

Incidentally, in a DPF, by the PM trapping, since particulate matter (soot) is deposited inside the honeycomb segment, pressure loss of the DPF increases, and a negative effect such as a crack may be caused. Therefore, as described above, the regeneration is necessary by combusting particulate matter (soot).

In addition, it is preferable that many through-cells are formed in the central portion of the honeycomb segment. In the case of forming many through-cells in the central portion of the honeycomb segment, since exhaust gas passage flow rate becomes high in the central portion, accumulation of deposited soot is relatively small in comparison with the peripheral portion. Therefore, the amount of heat generated by the combustion of the soot upon regeneration can be reduced in the central portion. This can reduce temperature rise upon regeneration, inhibit a crack or catalyst deterioration from being caused in the honeycomb segment, and consequently improves the regeneration limit of the ceramic filter.

Thus, the case that many though-cells are formed in the central portion or the inside portion of the honeycomb segment includes, besides the case that the disposition rate of the through-cells formed in the honeycomb segment disposed in the center of the DPF is made higher than that of the honeycomb segment disposed in the peripheral portion or the outside portion of the DPF, the case that the disposition rate of the through-cells formed in the central portion or the inside portion is made higher regardless of the disposition site of the DPF. In the former case where the disposition rate of the through-cells of the honeycomb segment disposed in the center of the DPF is made higher, general temperature control of the whole DPF is possible, and the effect of the present application can preferably be exhibited. In addition, in the latter case where the disposition ratio of each of the segments was made higher, even in the case of constituting DPFs into various shapes, properties of the DPFs are sufficiently exhibited, and the effect of the present application can preferably be exhibited.

Incidentally, the "disposition rate of the though-cells" here means, with respect to a predetermined area (central portion and the peripheral portion) in exhaust gas inlet side end face per the whole DPF, a proportion of the opening area of the through-cells present in the same area, or, with respect to a predetermined area (central portion and the peripheral portion) in exhaust gas inlet side end face per one honeycomb segment, a proportion of the opening area of the through-cells present in the same area. Further, the "central portion or the inside portion" means an inner region with respect to the outer shape of the aforementioned end face and present inside the outer shape of an end face of the DPF or the honeycomb segment. The central portion may arbitrarily be set inside the outer shape of the end face. Further, the "peripheral portion or the outside portion" means a region between the outer shape of the end face and the similarity shape of the outer shape.

In addition, many of the through-cells are preferably formed in the honeycomb segment located in the inner peripheral portion other then the segments located in the outer peripheral portion of the ceramic filter. As described above, since soot is easily deposited in the inner peripheral portion of the ceramic filter, the temperature rise upon regeneration is easily caused. This is because, when the temperature upon regeneration becomes the temperature where honeycomb segment can withstand or higher, a breakage or the like of the honeycomb segment is easily caused. Therefore, by forming many of the though-cells in the honeycomb segment located in the inner peripheral portion, soot is hardly deposited in the inner peripheral portion, and temperature rise upon regeneration can preferably be controlled.

In addition, as described above, by disposing the through-cells in the honeycomb segment located in the inner peripheral portion other than the segment located in the outer peripheral portion of the ceramic filter, since peripheral devices such as a sensor are not required, the structure becomes simple, and complex control is not necessary, which is preferable.

In addition, the through-cells are preferably formed regularly in the honeycomb segment. This is because, by disposing and forming the through-cells regularly, temperature upon regeneration can easily be controlled, and the regeneration limit can be improved.

Figure 4A:
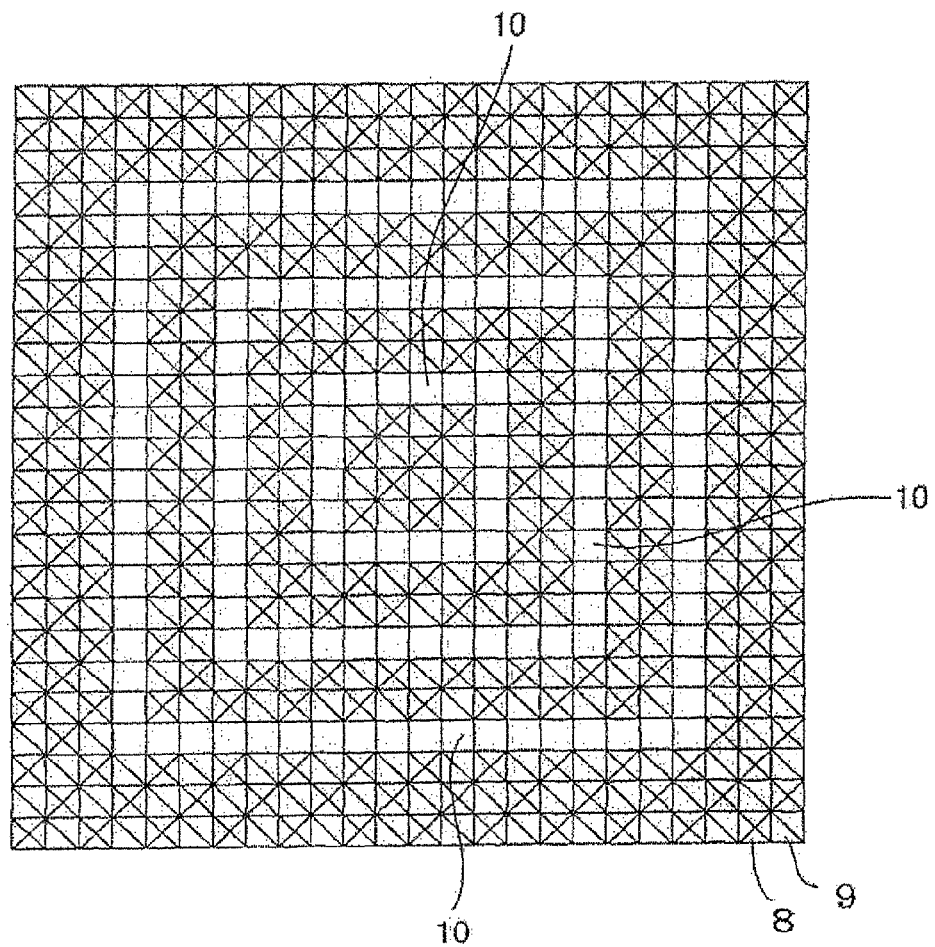
FIG. 4A is a schematic view showing one of the honeycomb segments constituting a ceramic filter where an embodiment of the present invention is applied and view showing an end face of the honeycomb segment where through-cells are regularly formed.
Figure 4B:
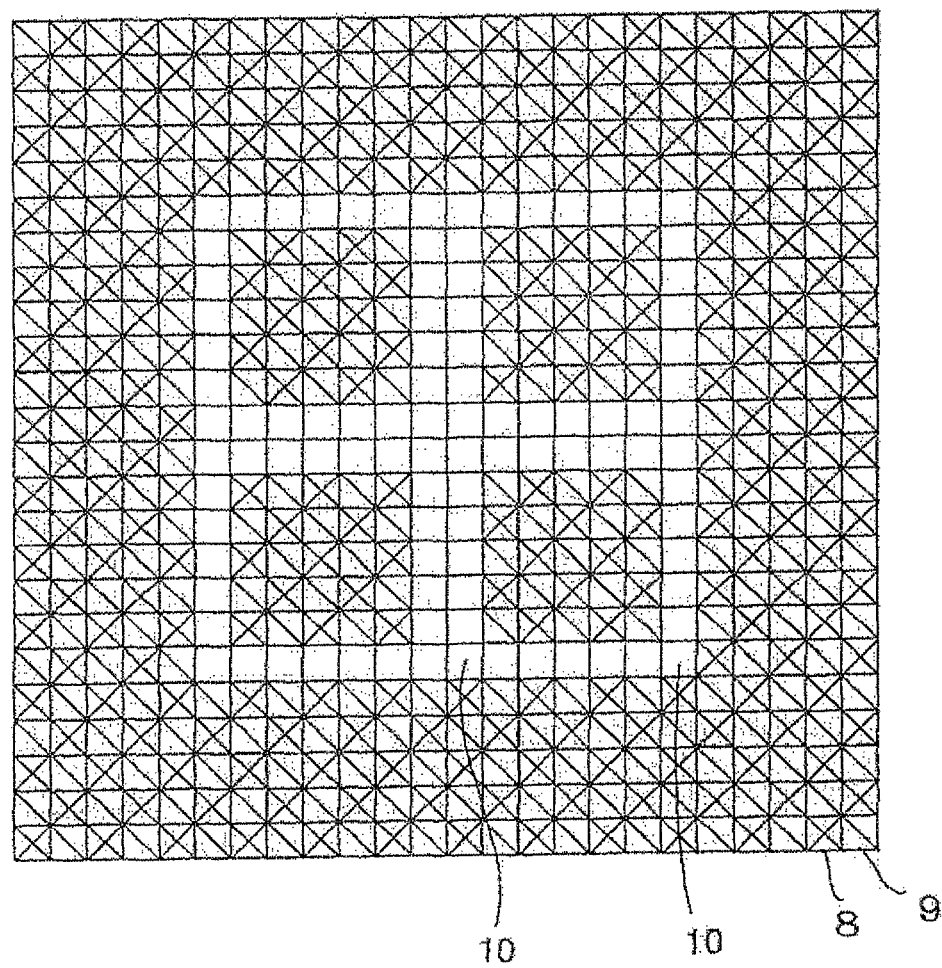
FIG. 4B is a schematic view showing one of the honeycomb segments constituting a ceramic filter where an embodiment of the present invention is applied and view showing an end face of the honeycomb segment where through-cells are regularly formed.
Figure 4C:
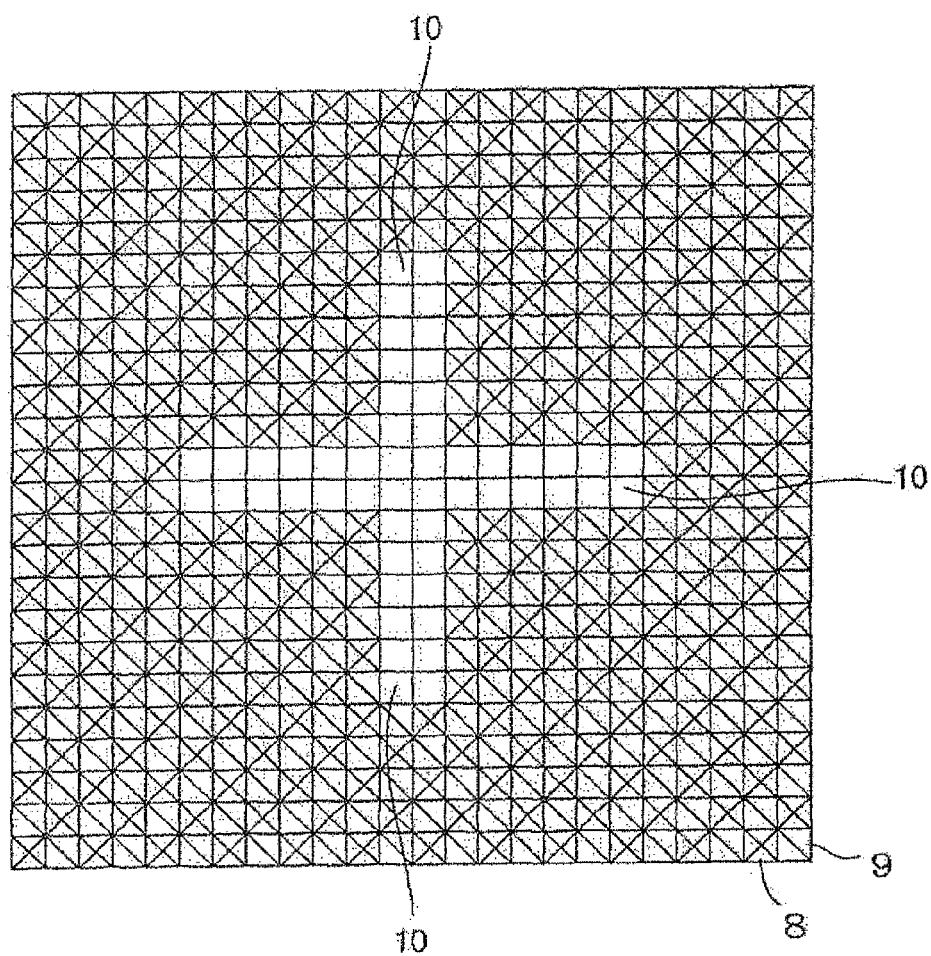
FIG. 4C is a schematic view showing one of the honeycomb segments constituting a ceramic filter where an embodiment of the present invention is applied and view showing an end face of the honeycomb segment where through-cells are regularly formed.

Here, specific examples where the through-cells are regularly disposed and formed are those shown in FIGS. 4A to 4C. In FIG. 4A, the through-cells are disposed and formed in a rectangular pattern. In FIG. 4C, the through-cells are disposed and formed in a cross pattern. By forming the through-cells as shown in these, since through-cells depending upon properties of each honeycomb segment can be formed, properties of the DPF can preferably be exhibited.

Incidentally, as described above, the through-cells formed regularly include not only the case that the linear pattern or the like is simply formed, but also the case that the through-cells are regularly disposed in a pattern in combination with the linear pattern and the rectangular pattern.

In addition, the case that the through-cells are irregularly formed is one of the preferable embodiments. For example, in a ceramic filter of the present embodiment formed by bonding a plurality of honeycomb segments, all the honeycomb segments are not disposed in the central portion of the filter. For example, in a filter formed of a segment structure of 4 vertical×4 horizontal honeycomb segments, four honeycomb segments are located in the central portion, and 12 honeycomb segments are disposed in the outer peripheral portion. In such a case, it is preferable that not only the case that the disposition rate of the through-cell in the outer peripheral portion is the same as the disposition rate of the through-cells contained in the honeycomb segments disposed in the central portion, but the case that the disposition rate of the through-cells in the outer peripheral portion is different from that in the central portion are formed because the properties as the whole filter can synergistically be improved.

In addition, in the case of forming a DPF coping with various properties such as a shape, size, and the like, there is a case that the performance of the whole DPF can be educed more easily by forming the through-cells irregularly. The shape of a ceramic filter is not only a complete circle or an ellipse, and there are various shapes (e.g., a triangle cross section and a hexagonal cross section). In such a case, the case that the through-holes are formed irregularly in the honeycomb segment disposed in the outer periphery in comparison with the center makes temperature control in each honeycomb segment easy, and the control as the filter formed by bonding the honeycomb segments can be exhibited effectively as a cooperating whole in connection with the properties of each of the honeycomb segments.

Figure 5A:
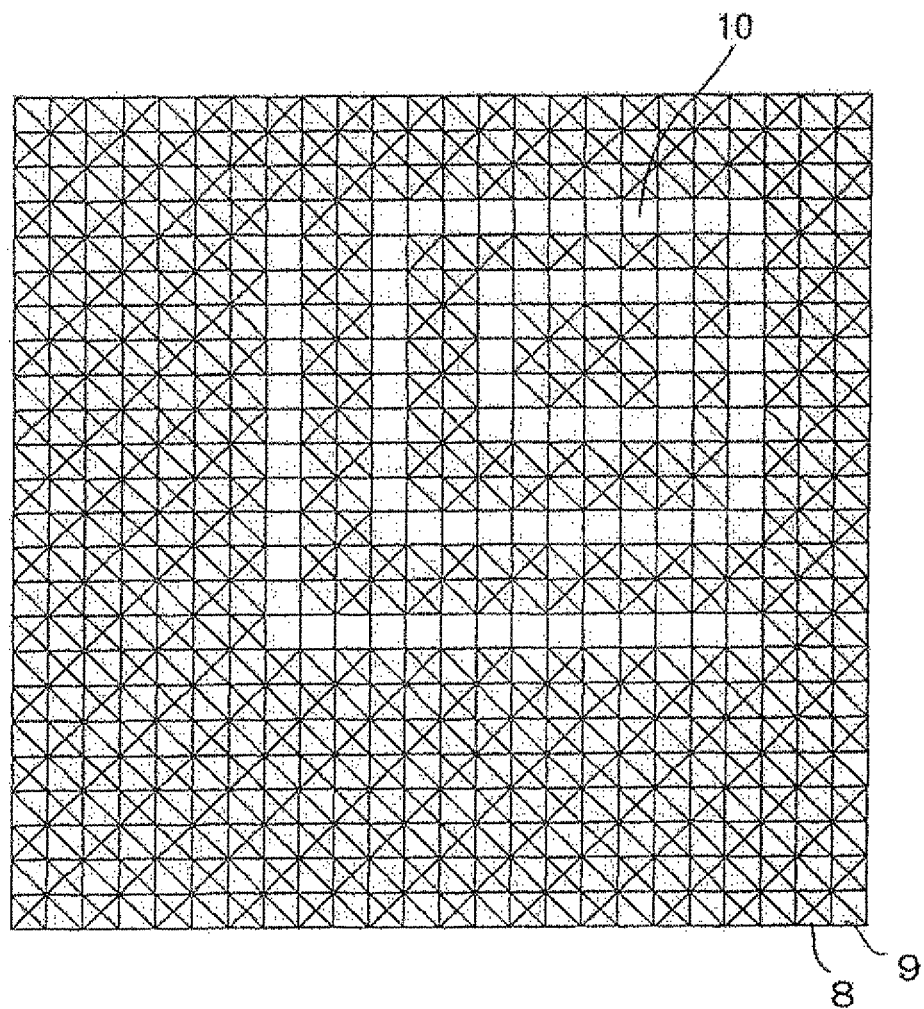
FIG. 5A is a schematic view showing one of the honeycomb segments constituting a ceramic filter where an embodiment of the present invention is applied and view showing an end face of the honeycomb segment where through-cells are irregularly formed.
Figure 5B:
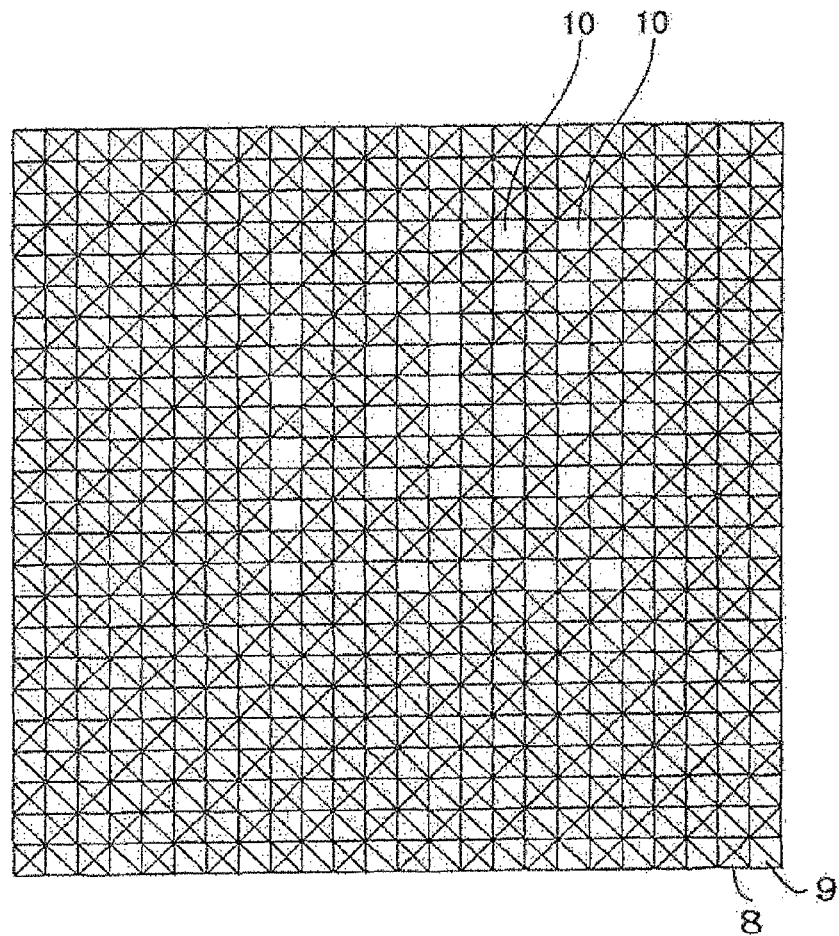
FIG. 5B is a schematic view showing one of the honeycomb segments constituting a ceramic filter where an embodiment of the present invention is applied and view showing an end face of the honeycomb segment where through-cells are irregularly formed.

Here, FIGS. 5A to 5B are schematic views each showing the case that through-cells are irregularly disposed and formed. As shown in FIGS. 5A and 5B, the through-cells 10 are disposed literally in an irregular pattern without being disposed in a linear pattern or a rectangular pattern, thereby not only local temperature control as each honeycomb segment, but also temperature control as a whole can be performed as a result of joint action.

Further, the case that a so-called both end-plugged cell where both the ends of the cell are plugged is formed is one of the preferable embodiments. By forming such a both end-plugged cell besides the aforementioned first through-hole, second through-hole, and through-cell, the soot deposition amount, exhaust gas inflow rate, and inflow amount can be adjusted; a crack, catalyst deterioration, and the like can be inhibited as the whole honeycomb segment; and, as an adverse effect of these can be suppressed, the regeneration limit as the whole ceramic filter and properties of the whole filter can be improved; which is preferable.

In addition, the through-cell is preferably formed with being plugged in neither the end at the inlet nor the end at the outlet. Since there is no plugging step in the case that the through-cell is formed with being plugged in neither the end at the inlet nor the end at the outlet, the production process can be simplified, and deposition of the soot amount can be suppressed as much as possible, which is preferable.

In addition, the case that both the ends or one end of the through-cell are/is plugged, followed by forming a small through-hole in a part of the plugged end portion(s) is also one of the preferable embodiments. It means that, besides the through-cell described above, the through-cell where both the ends or one end are/is plugged, followed by forming a small through-hole in a part of the plugged end portion(s) is included in the through-cell. When the through-cell having a small through-hole in the plugging is further formed in the honeycomb segment, the passage flow rate of exhaust gas in the through-hole can be controlled in an extremely delicate manner, which is preferable. That is, in the through-cells of each honeycomb segment constituting a DPF, it is not necessary that the passage flow rate of the exhaust gas is uniform. That is, there are many cases that the honeycomb segment disposed in the outer periphery has a structure capable of withstanding a crack or the like even if the maximum temperature upon regeneration is high in comparison with the center of the DPF because of the structure of the DPF. This is because, depending on the site of the honeycomb segment in the DPF, the soot deposition amount different, and because the central portion of the DPF tends to have higher temperature. In such a case, the case that soot deposition amount is larger in the through-cell formed in the honeycomb segment disposed in the outer periphery than in the through-cell formed in the honeycomb segment disposed in the center can educe properties of the DPF as a whole. Therefore, by providing a plugging in the through-cell and forming a small through-hole, the passage flow rate of exhaust gas and the soot deposition amount described above can be controlled.

In other words, if neither of the ends is plugged, the flow rate in the through-cell is high in comparison with the plugged through-cell. Therefore, except for the very small amount of soot deposited in the through-cell by Brownian diffusion and exhaust gas moved to adjacent through channels, the gas flows in from the inlet of the through-cell and discharged toward the outlet of the through-cell. Therefore, since deposition of the soot is reduced to an extremely small amount, the maximum temperature upon regeneration can easily be controlled, and the regeneration limit can be improved.

On the other hand, in the case that both the ends or one end of the through-cell are/is plugged, followed by forming a small through-hole in a part of the plugged end portion(s) as a through-cell, the inflow rate in the through-hole becomes low, and deposition of the soot amount increases in comparison with the aforementioned though-cell having no plugging. However, since it is not completely plugged at both the end even if the soot amount is increased in comparison with the aforementioned one, deposition of soot amount can still be suppressed to the minimum, and control to the maximum temperature where it can locally withstand is easy. Therefore, the regeneration limit can be improved.

Here, what is meant by the expression "plugging of the through-cell at one end" is that the case where only one end portion is plugged without plugging the other end portion of the cell, followed by forming a small through-hole in the plugged end is included in the embodiments of the present application because it is also effective for controlling the soot amount. By thus forming the through-cell, for example, in the case that the outlet is plugged to form a small through-hole there without plugging the inflow port serving as the exhaust gas inlet, since opening rate is low in comparison with one without having plugging portions, the flow rate in the vicinity of the exhaust gas outlet is decreased, and the soot deposition amount is higher on the inlet side than in the vicinity of the outlet. Further, soot having a large particle size is easily deposited in the vicinity of the inlet since the soot having a larger swell size has a larger weight. Therefore, by the small soot amount in the vicinity of the outlet of the honeycomb segment upon regeneration, the temperature rise in the vicinity of the honeycomb segment outlet upon regeneration can be suppressed.

For example, when the small through-hole is formed in the plugging of the inflow port serving as the exhaust gas inlet but a through-hole without plugging is formed at the outlet, since the cell on the inlet side of the through-cell is not completely open but extending there through, the entering amount of the exhaust gas entering the through-cell is not zero. However, the amount of soot entering (flowing into) the through-cell having a small through-hole formed therein does not enter to the extent where the maximum temperature upon regeneration exceeds the crack limit, and the deposition of the soot amount in the through-cell can be suppressed. Then, the present embodiment can exhibit the excellent effects in suppressing temperature rise upon regeneration simultaneously with increasing the trapping effect in combination with the cooling effect generated when the exhaust gas passes through the through channel. In addition, by the constitution of the combination of the through-cell and the segment structure in this manner, peculiar temperature distribution and complex temperature distribution which cannot be seen in a unitary structure by the thermal capacity, thermal conductivity, soot distribution, and the like of the bonding material, which are generally generated by the segment structure can be controlled by the segment structure, and, by plugging the through-cell, followed by forming a small through-hole, minute temperature control becomes possible, and effect of the present application can be exhibited, which can be said to be one of more preferable embodiments.

In addition, when the through-cell is formed by forming a small through-hole in the plugging of the outlet port serving as the outlet for exhaust gas without plugging the inlet, though the exhaust gas passage flow rate is low in comparison with the unplugged through-cell, the exhaust gas passage flow rate is high in comparison with the plugged first and second through channels. Therefore, the deposition of soot amount is large in comparison with the unplugged through cell though it is small in comparison with the first and second through channels, and minute temperature rise control upon regeneration becomes possible.

Incidentally, it is not necessary to make the opening area of the through hole uniform among all the through channels, and the through channels having different opening areas may be present together. Since temperature rises particularly in the vicinity of plugging portions on the exhaust gas outlet side of the filter, it is preferable to increase the thermal capacity of the plugging portion on the outlet side in comparison with the exhaust gas inlet side.

Here, the "through-cell having a small through-hole formed therein" (1) may be formed in combination with the "unplugged through-cell" in a single honeycomb segment, or (2) only the "through-cell having a small through-hole formed therein" may be formed in a single honeycomb segment. Alternatively, a DPF may be formed by (3) forming the "unplugged through-cell" only in one honeycomb segment and the "through-cell having a small through-hole formed therein" only in another honeycomb segment and combining the honeycomb segments. Since the through-cell having a small through-hole formed therein requires a further operation because a small through-hole is formed in comparison with the through-cell without being plugged at both the ends of the through-cell, it is preferable to suitably combine with the unplugged cell as necessary.

Incidentally, as a method for forming the "small through-hole", (1) it may be formed by injecting a ceramic paste to serve as a plugging portion in an end portion of a through channel in a step for forming a plugging portion in the end portion of the through channel, followed by spraying a liquid in a part of the ceramic paste, or (2) the through-hole may be formed in the plugging portion by, upon or after injecting a ceramic paste to serve as a plugging portion in an end portion of a through channel, inserting a rod-shaped thermoplastic organic substance or a rod-shaped combustible substance into the ceramic paste, and then heating them to melt and flow out the rod-shaped thermoplastic organic substance or the rod-shaped combustible substance or causing the aforementioned rod-shaped combustible substance to combust and disappear. Alternatively, (3) it may be formed by, after injecting a ceramic paste to serve as a plugging portion in an end portion of a through channel, arranging a plurality of protrusions on a plate-shaped pedestal and pressing a hole-making jig against them, or (4) the through-hole may be formed in the plugging portion by, after injecting a ceramic paste to form a plugging portion in an end portion of a through channel, irradiating a laser in a part of the ceramic paste.

Figure 6A:
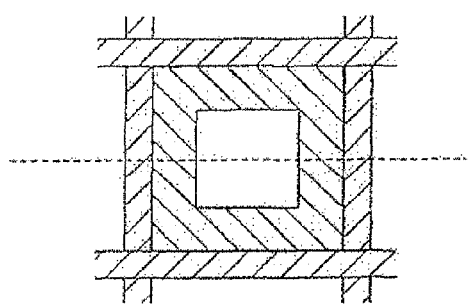
FIG. 6A is a view schematically showing one of the honeycomb segments constituting a ceramic filter where an embodiment of the present invention is applied and schematic view of a through-cell with through-cell plugging and partially enlarged plan view of a rectangular small through-hole viewed from an end face side of the honeycomb segment.
Figure 6B:
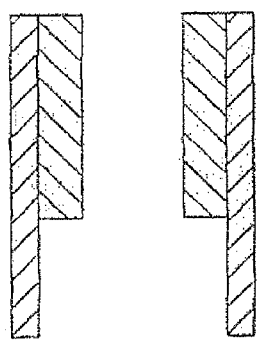
FIG. 6B is a view schematically showing one of the honeycomb segments constituting a ceramic filter where an embodiment of the present invention is applied and schematic view of a through-cell with through-cell-plugging and partially enlarged plan view obtained by cutting the through-cell of FIG. 6A along the axial direction (longitudinal direction) of the honeycomb segment.
Figure 7A:
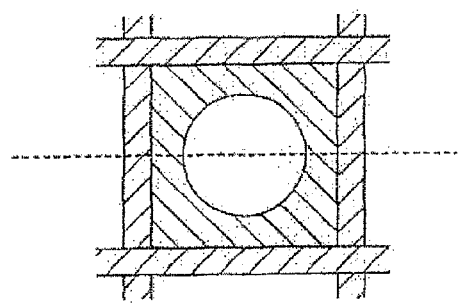
FIG. 7A is a view schematically showing one of the honeycomb segments constituting a ceramic filter where an embodiment of the present invention is applied and schematic view of a through-cell with through-cell-plugging and partially enlarged plan view of a circular small through-hole viewed from an end face side of the honeycomb segment.
Figure 7B:
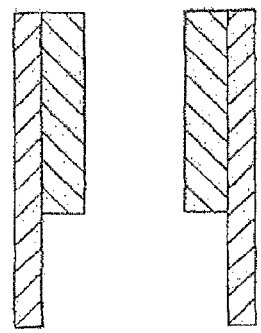
FIG. 7B is a view schematically showing one of the honeycomb segments constituting a ceramic filter where an embodiment of the present invention is applied and schematic view of a through-cell with through-cell-plugging and partially enlarged plan view obtained by cutting the through-cell of FIG. 7A along the axial direction (longitudinal direction) of the honeycomb segment.
Figure 9A:
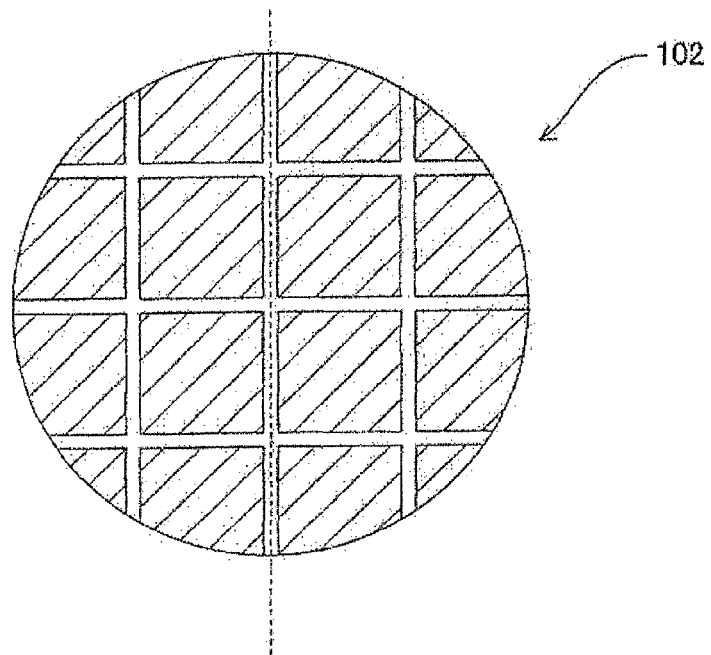
FIG. 9A is a schematic view schematically showing an end face of a conventional honeycomb segment.
Figure 9B:
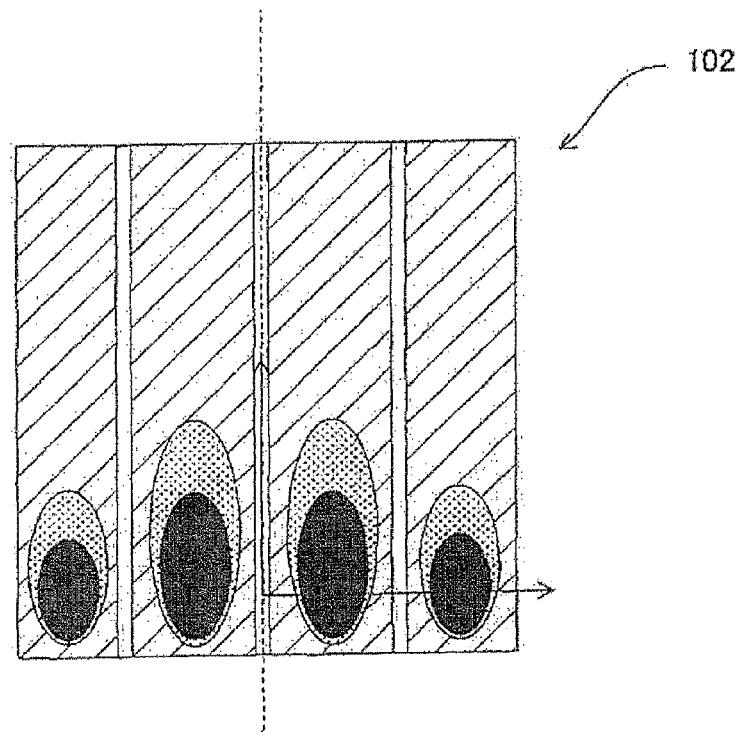
FIG. 9B is a schematic view schematically showing an appearance of forming a heat spot in the center because of low temperature in the outer peripheral portion of a conventional honeycomb segment.
Figure 9C:
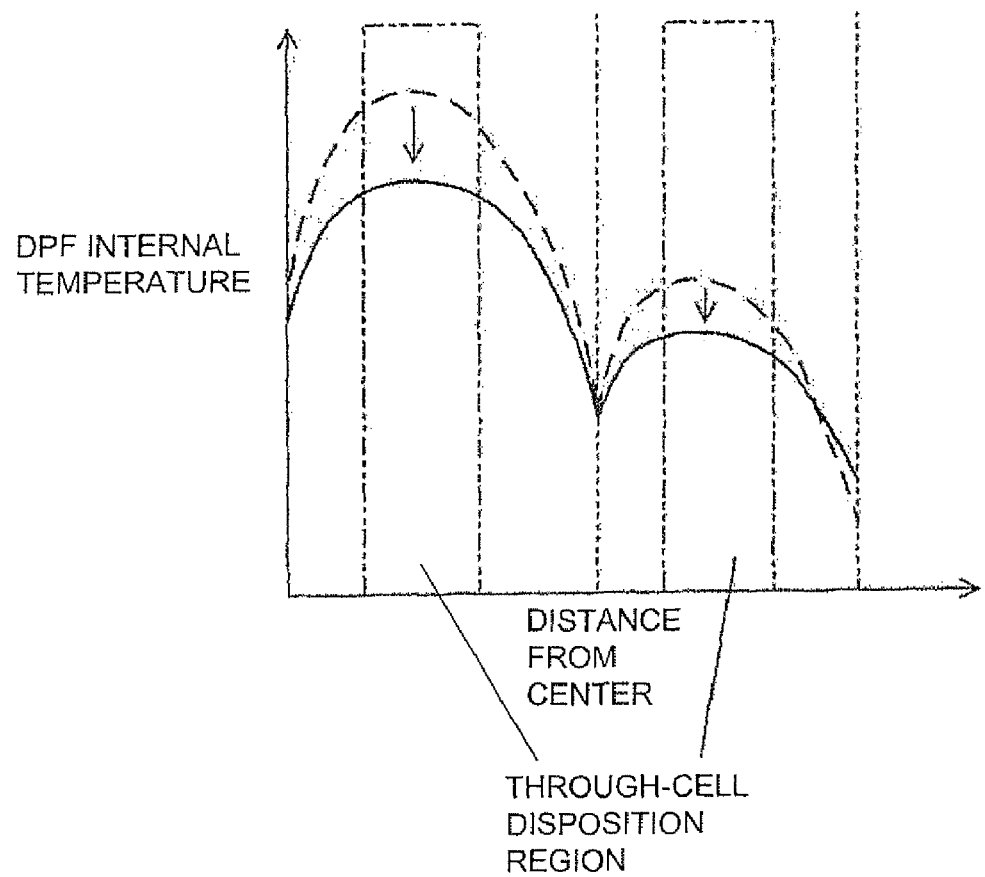
FIG. 9C is a graph schematically showing an appearance of forming a heat spot in the center because of low temperature in the outer peripheral portion of a conventional honeycomb segment.
Figure 10:
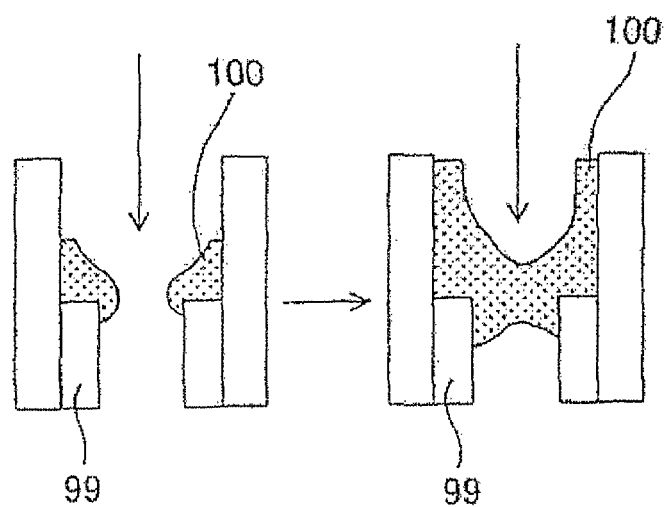
FIG. 10 is a schematic view schematically showing an appearance of soot deposition on a partial plug of a conventional honeycomb segment and schematic view showing a cross section of the honeycomb segment in the longitudinal direction.

Further, with referring to FIGS. 6A, 6B, 7A, 7B, 8A, and 8B, the opening shape of the small though-hole will be described. Here, FIGS. 8A and 8B each schematically shows a through-cell 10A with no plugging. FIG. 8A is a partially enlarged plan view viewed from an end face side of a honeycomb segment, and FIG. 8B is a partially enlarged plan view obtained by cutting a honeycomb segment in an axial direction (longitudinal direction). In addition, FIGS. 7A and 7B each schematically shows a plugged through-cell 10B. FIG. 7A schematically shows a through-cell with plugging and partially enlarged plan view of a circular small through-hole viewed from an end face side of a honeycomb segment. FIG. 7B is a partially enlarged view obtained by cutting the honeycomb segment in an axial direction (longitudinal direction). FIGS. 6A and 6B schematically show a plugged through-cell 10C and schematically show a through-cell with plugging. FIG. 6A is a partially enlarged plan view of a rectangular small through-hole viewed from an end face side of a honeycomb segment. FIG. 6B is a partially enlarged view by cutting the honeycomb segment in the axial direction (longitudinal direction).

As shown in FIGS. 8A and 8B in the case that the through-cell where the through-hole is not plugged is formed, the opening portion which the though-cell has becomes maximum. Therefore, by thus forming the through-cell, the effect in lowering temperature upon regeneration can preferably be exhibited. On the other hand, in the case that the through-hole is formed into a round shape as shown in FIG. 7A or a rectangular shape as shown in FIG. 6A so as to extend there through after plugging, a step is formed between the opening portion and the plugging member, and an excellent effect in being capable of suppressing temperature rise upon regeneration can be exhibited in combination of the cooling effect generated when exhaust gas passes through the through channel with increasing the trapping efficiency though the case is inferior to the through-cell without being plugged in the point of lowering the temperature upon regeneration, and minute temperature control becomes possible, which is preferable.

In addition, it is preferable that the size of the through-hole is suitably selected as necessary. That is, this is because, the larger the size of the through-cell is, the larger the PM permissible deposition amount up to clogging due to PM deposition is, which is preferable, and because the smaller the through-cell size is, the more the trapping efficiency improves. However, since the effect of the present application is hardly exhibited in the case that the size is extremely big or extremely small, it is preferable to suitably select the size as necessary so as to obtain a desired honeycomb segment or a desired DPF.

In addition, it is preferable that the opening area of the through-cell is 20 to 100% of the opening area of the unplugged cell. That is, this is because, in the case that both the ends or one end portion are/is plugged and that a small through-hole is formed so as to pass through the plugged both the ends or one end portion, when the size of the through-cell having a small through-hole is 20% or less of the cell opening size, the though-hole is clogged due to PM deposition at a PM deposition amount of 3 g/L or less, and the temperature-reducing effect upon regeneration cannot be obtained. That is, it is not preferable because the temperature rise upon regeneration is increased to be prone to cause a crack or catalyst deterioration in a honeycomb segment. Incidentally, the case that the opening area of the though-cell is 100% is the same as the case that unplugged through-cell is formed.

In addition, the case that the cross-sectional shape on the outlet side is formed differently from the cross-sectional shape on the inlet side is one of the preferable embodiments. The exhaust gas passage flow rate in the through-hole can easily be controlled to make adjustment of the amount of soot capable of being deposited easy. Therefore, minute control of temperature rise upon regeneration is possible.

It is more preferable that the cross-sectional shape of the cell on the inlet side is constituted of an octagon and that the cross-sectional shape of the cell on the outlet side is constituted of a quadrangular cell. The cell of a so-called octagonal (inlet)—quadrangular (outlet) design has an effect in reducing pressure loss, and it is one of the preferable embodiments because the effect of the present application can be obtained even in combining the aforementioned through-cell with the cell of this design.

Incidentally, in the cell structure constituted of an octagon—a quadrangle, there are the cases (1) that plugging on the outlet side (octagonal plugging) is constituted as the through-cell or (2) that plugging on the inlet side (quadrangular plugging) is constituted as the through-cell.

Specifically, in the case that plugging on the outlet side (rear end of the inlet cell) is the through-cell, since the inlet cell constituted of an octagon has a smaller area of the partition wall shared with the outlet cell than that of the cell structure constituted of only a quadrangle, when the fluid passes through the partition wall, the flow rate thereof becomes high, and then the wall penetration pressure loss is increased. In addition, since the cross-sectional area is large because the shape is octagonal, the inertial resistance upon passing through a conduit becomes small. Thus, in the balance between the resistance upon penetrating the wall and the inertial resistance, the case when the former is higher but the latter is lower means the fluid tries to flow downstream without passing through the walls. In this case, since penetration is caused more in the walls in the vicinity of the outlet plugging, much soot is deposited in the vicinity of outlet plugging, and the outlet side tends to have high temperature upon regeneration. Therefore, when the through-cell is provided on the outlet side, the controlling efficiency of high temperature upon regeneration is increased.

In addition, in the case that the through-cell is provided at the inlet side plugging (upstream of the outlet cell), since the inertial resistance of the conduit is high because of the small flow passage cross section in the outlet side of cell, the pressure loss becomes high. Therefore, pressure loss can be reduced in a large amount by providing this type of through-cell.

In addition, it is preferable that the plugging is formed in a checkerwise pattern and that a part thereof is constituted as a through-cell. Thus, it is preferable to increase the plugging portion capacity to obtain high heat capacity. As a result, it is easy to control the temperature rise upon regeneration. Since the inlet cells and the outlet cells are aligned always alternately by disposing plugging in a checkerwise pattern, the fluid having entered from the inlet can flow out to four faces. In contrast, in the case that one of them is continuously aligned for constitution without a checkerwise pattern, the fluid cannot pass through the partition walls between them. That is, in the case that plugging is formed in a checkerwise pattern, the area where the fluid passes through the partition walls can be made largest, which is preferable. In other words, when the through-cells are disposed in a design of a checkerwise pattern, since the passage flow rate of each cell is nearly uniform, the trapping efficiency can be kept high, and the regeneration limit is raised because PM deposition distribution becomes nearly uniform.

In addition, it is preferable that at least a both end-plugged cell is included in a part of the plugging formed in a checkerwise pattern. In addition to the aforementioned constitution, by the increase of the plugging portion capacity, high heat capacity can be obtained, and control of temperature rise upon regeneration becomes easy, which is preferable.

It is preferable that the through-cells share 2 to 40% of the whole cell number. By forming the through-cells to be 2 to 40% of the whole cell number, the cooling effect by the gas passing through the through-cells and the soot deposition distribution are adjusted, the regeneration limit is improved, and PM emission becomes within a desired numeric range, which is preferable. In addition, it is more preferable that the through-cells share occupy 4 to 30% of the whole cell number. By forming the through-cells to be 4 to 30% of the whole cell number, since the cooling effect by the gas passing through the through-cells is exhibited, and the soot deposition distribution can sufficiently be performed, the regeneration limit can further be improved, and PM emission becomes within a desired numeric range, which is preferable. It is furthermore preferable that the through-cells are 5 to 20% of the whole cell number. By forming the through-cells to be within a predetermined range, more preferable improvement of the regeneration limit is realized, and, regarding PM emission, a more preferable numeric range can be obtained.

[1-1-2] Other Constitution of Honeycomb Segment:

There is no particular limitation on the shape of a honeycomb segment, and a shape of a cross-section (shape of the bottom face) perpendicular to the central axis of the columnar structure of the honeycomb structure may be a polygon such as a quadrangle, a circle, an ellipse, an oval, an irregular shape, or the like. In addition, there is no particular limitation on the shape of a cell and may be formed as a triangle, a quadrangle, a hexagon, an octagon, a circle, or a combination thereof.

The honeycomb segment uses as a material thereof one kind or a combination of some kinds selected from the group consisting of cordierite, mullite, alumina, spinel, silicon carbide, silicon nitride-cordierite based composite material, silicon-silicon carbide composite material, silicon nitride, lithium aluminum silicate, aluminum titanate, and Fe—Cr—Al based metal from the viewpoints of strength and thermal resistance.

In manufacturing of the honeycomb segment, to the material selected from the aforementioned ones are added a binder, a surfactant, water, and the like to obtain kneaded clay having plasticity. As the binder, there is used, for example, methyl cellulose, hydroxypropoxyl cellulose, hydroxyethyl cellulose, carboxylmethyl cellulose, or polyvinyl alcohol. The kneaded clay is subjected to extrusion forming to obtain a honeycomb structure having a large number of through channels partitioned by partition walls and extending there through in a longitudinal direction. After the honeycomb structure is dried by microwaves, hot air, or the like, it is fired to manufacture a honeycomb segment.

The bonding layer employs a mixture of inorganic particles, fibers, and colloidal sol as the material. The inorganic particles are, for example, silicon carbide, silicon nitride, cordierite, alumina, or mullite, including cement. The colloidal sol is, for example, colloidal silica, or colloidal alumina. The bonding material employs the material obtained by adding metal such as metal fibers, pore former, various kinds of ceramic particles to the mixture as necessary.

[2] Method for Manufacturing Ceramic Filter of the Present Embodiment:

Hereinbelow, the best mode for carrying out a method for manufacturing a ceramic filter in the present embodiment will specifically be described with referring to drawings. However, the present invention widely includes a method for forming through-holes in a ceramic filter provided with the invention specifying articles and not limited to the following embodiment.

In manufacturing a ceramic filter in the present embodiment, as shown in FIGS. 1 to 3, among the steps for forming plugging in an end portion of the through channel 7, the step for applying a film to make a hole thereon with a laser, it is preferable to make a hole with a laser in the film only where the cells other then the through-cells 10 are formed and press the plugging paste there into manufacture a ceramic filter. Above all, in a step for forming plugging in an end portion of the through channel 7 and step for making a hole with a laser with applying a film, it is preferable that, without making a hole only where a plug-less portion is formed upon making laser holes in a checkerwise pattern, the plugging paste is pressed thereinto to manufacture a ceramic filter.

Specifically, it is performed in a step for obtaining a plugged honeycomb formed article by plugging an opening portion on one end face side of each of the predetermined cells of the honeycomb formed article with a plugging material (see FIGS. 3A to 3C). As a method for disposing (forming) the plugging on an end portion of the through channel, in the first place, a film is disposed on an end face of a honeycomb formed article in a masking sub-step. This film may employ polyester film. An adhesive is applied on one face of the film, and the film is stuck on the end face of the honeycomb formed article. Next, by a laser apparatus capable of NC scanning, holes are made in the polyester film stuck of the honeycomb formed article in the portions corresponding to the opening portions of the predetermined cells at the end face. When the holes are made, the periphery of the holes rises by the influence of melt of the film.

In the case of forming the plugging in a checkerwise pattern, it is preferable that holes are made in the portions corresponding with the opening portions of the aforementioned predetermined cells in a checkerwise pattern.

Next, a honeycomb formed article having a perforated film (film perforated in a checkerwise pattern) stuck thereon is put with pressure into a storage container where the aforementioned plugging material is stored, the plugging material in the storage container is filled into the cells from the holes in the film for disposition. After a predetermined amount of the plugging material is disposed, the honeycomb formed article is taken out from the storage container. Thus, a plugged honeycomb formed article can be obtained.

Here, in the case of disposing the plugging material, disposition may be made in a checkerwise pattern in one end face (or both the end faces), or, for example, the plugging material may be disposed in a closely-spaced matter in a predetermined region though the illustration is omitted. Alternatively, the plugging material may be disposed in an aligned pattern, a concentric pattern, or a radial pattern in one end face (or both the end faces), and it is possible to form various patterns.

In addition, the chipping of a corner may be prevented by plugging all the cells on the outer peripheral side of the honeycomb formed article. In this case, the plugging material may be disposed in both the end faces or in only either one of the end faces.

Incidentally, when the plugging material is disposed in the honeycomb formed article, even if the plugging material is the same as the material for the honeycomb formed article, the firing contraction rate is not always the same in the case of actually performing firing. The causes are considered to be, for example, that the honeycomb formed article obtained by extrusion-forming the forming material has the oriented raw material particles, that there is a gap between the thickness of the partition walls of the honeycomb formed article and the size of the plugged material, and that the plugging material has large contraction upon drying. Therefore, in the method for manufacturing a plugged honeycomb structure of the present embodiment, the compounding ratio of the raw material and the raw material particle size are suitably adjusted in advance and set to obtain an appropriate value of the firing contraction rate of each of them. In a general plugged honeycomb structure, since the outer periphery is processed to newly form the outer periphery by coating, the difference in firing contraction rate between the honeycomb formed article and the plugging material has an allowable range to some extent.

In addition, by making the plugging material have low thermal capacity, it is possible to make the temperature difference hardly caused upon firing, and more uniform firing can be realized in the following firing step. As a method for making the plugging material 17 to have low thermal capacity, for example, the length of the plugging material in the filling direction is made short, or the plugging material is made to have high porosity. The length of the plugging material in the filling direction is preferably 5 mm or less, more preferably 3 mm or less. Incidentally, by combining the method with making the plugging material 17 have high porosity, a higher effect can be obtained.

In addition, as another method for making the plugging material have low thermal capacity, as shown in FIGS. 3B and 3C, a depression may be formed in the filled plugging material, or a cavity or a gap may be formed inside the filled plugging material. As a method for forming a depression, water content in the slurry constituting the plugging material is increased to be able to utilize a sink mark phenomenon caused after filling the slurry into the cells. In addition, by filling the plugging material into the cells at a state of high viscosity, it is utilized to form a gap between the plugging material and the partition walls of the honeycomb formed article.

In the case of forming a cavity or a gap inside the plugging material, the cavity or the gap having a larger volume than a pore formed by the porous raw material or a pore former contained in the porous raw material is formed inside the plugging material. By using the plugging material in a state that air bubbles are generated in the slurry constituting the plugging material, such a cavity or a gap can easily be formed. In addition, the slurry may be filled again from the top after a sink mark phenomenon is caused. The shape of the cavity or the gap may be any shape as long as a volume capable of contributing to making the plugging material have low heat capacity can be secured. Incidentally, the aforementioned methods for making the plugging material have low thermal capacity may be used alone or in combination.

As a method for drying the plugging material, hot air (for example, 120° C.) is applied on the end face on the plugging material-disposed side of the honeycomb formed article for drying for about 5 minutes without peeling off the film. Drying is possible with a hot air blower, a hot plate, a far-infrared radiation drier, or the like. Thus, the plugged honeycomb formed article is obtained.

The plugging members in the present embodiment may be formed by plugging one end face each of a plurality of through-holes in the honeycomb-shaped filter substrate in a checkerwise pattern, and preferably the members may be formed by plugging the another end face each of through-holes different from the through-holes which has been plugged in the one end facing a checkerwise pattern. This enables the exhaust gas introduced from one of the end faces to pass through the partition wall partitioning either the first inflow port or the second inflow port or the partition wall partitioning a through-cell, and the particulate matter in the exhaust gas can be trapped and removed.

[3] A Method for Manufacturing Ceramic Filter of the Present Embodiment:

In manufacturing a ceramic filter of the present embodiment, as shown in FIGS. 1 to 3, it is preferable that, after forming a plugging 11, a through-cell is formed by providing a through-hole in the plugging in a step of forming a through-cell 10. Above all, it is preferable that, after plugging is formed in a checkerwise pattern, a through-cell is formed by providing a through-hole in the plugging in a forming method for forming a through-cell.

Specifically, the method for forming a through-cell in a ceramic filter of the present embodiment is different from the aforementioned method [2] for manufacturing a ceramic filter, in the point that the through-hole is provided in the aforementioned plugging after the plugging is formed. That is, as shown in FIGS. 3A and 3B, as a method for disposing (forming) the plugging 11 in an end portion of the through channel 7, in the first place, a film is disposed on an end face of a honeycomb formed article in a masking sub-step, an adhesive is applied on one face of the film, the film is stuck on an end face of the honeycomb formed article, and portions corresponding with opening portions of the predetermined cells on an end face of the honeycomb formed article where the polyester film is stuck is perforated by a laser apparatus capable of NC scanning. Further, the honeycomb formed article where a perforated film (film perforated in a checkerwise pattern) is stuck is put in the storage container where the aforementioned plugging material is stored with pressure to fill the plugging material in a storage container into the cells for disposition. After a predetermined amount of the plugging material is disposed, the honeycomb formed article is taken out from the storage container. After obtaining the thus plugged honeycomb, holes are made again in desired cells with a laser apparatus capable of NC scanning or the like (in a checkerwise pattern) to obtain a formed article.

Incidentally, the aforementioned perforation is just an example and not limited to such a perforation method, and perforation may be conducted by a method such as a perforation method described upon forming the aforementioned small through-hole.

[4] Method for Forming Through-Cell in Ceramic Filter of the Present Embodiment:

In manufacturing a ceramic filter in the present embodiment, in a step for forming through-cells 10 as shown in FIGS. 1 to 3C, it is preferable that, after plugging is formed, a part of the plugging is bored to form the through-cells. Above all, in a method for forming through-cells, it is preferable that, the plugging is formed in a checkerwise pattern, a part of the plugging is bored to form the through-cells.

Specifically, in a method for forming through-cells in a ceramic filter of the present embodiment, there is a method for forming through-cells by, after plugging is formed and dried, boring a part of the plugging in the same manner as in the aforementioned methods for manufacturing a ceramic filter in [2] and [3]. Additionally, there are methods such as a method where, after the plugging is formed and before drying, a part of the plugging is bored to form through-cells, and further a method where, after the plugging is formed and dried, a part of the plugging of the fired article (finished article) obtained via the firing step is bored to form through-cells unlike the manufacturing methods of [2] and [3]. In the method for forming through-cells by boring the plugging, for example, unnecessary plugging is manually bored (for example, by hand) by the use of a brush or the like, or boring is performed by making a hole with a drill having a diameter of about 0.5 mm. Incidentally, in the case of boring by making a hole with the aforementioned drill, since a through-cell shape is only a circle, adjustment is preferably performed by putting a stick file to obtain desired shape and size. Incidentally, the aforementioned method is an example, and, without limiting to such a method, any of methods capable of exhibiting the effect of the present application by, for example, boring a part of the plugging is included in the aforementioned through-cell-forming method in the ceramic filter.

Example

To develop the best design for the increase of the number of the through-cells from the viewpoints of the temperature reduction effect and PM emission deterioration (decrease in trapping efficiency), the regeneration test at an engine bench was performed to observe a temperature where a crack is generated, and PM emission was tested as well in a vehicle. The exemplified test methods were shown as follows:

(Regeneration Test)

In the first place, a DPF is mounted on a 2.0 L diesel engine, and a predetermined amount of soot was deposited, followed by driving at 2000 rpm×50 Nm. Next, the DPF inlet gas temperature was raised to 650° C. by post-injection. When the pressure loss between the front and the rear portions of the DPF started to increase, the post-injection was stopped, and the engine driving state was made to be an idle state. At that time, since the oxygen content rapidly increased, and the flow rate was decreased, the DPF internal temperature rapidly rose, and a crack was generated in the DPF outlet end face when the temperature exceeded the material limit. The soot amount was gradually increased, and the soot amount [g/L] per volume when a crack was generated was determined as the regeneration limit value.

[PM Emission Test]

Regarding the PM emission test, a DPF is mounted on a 2.0 diesel vehicle. According to European emission regulations, PM emission during NEDC mode run was evaluated. Comparison was made with the average value [mg/km] during NEDC mode run.

(Experiment Standard)

By the use of two series of DPF having a size of 144 in diameter and 152 mm in length, a segment size of 36×36 mm, and a segment disposition of 4×4; one of which is a DPF having cell structure of 12 mil/cpsi (rib thickness of 0.31 mm/cell pitch of 1.47 mm) and the another is the one having cell structure of 15 mil/cpsi (0.38 mm/1.80 mm), the through-cells are increased in each series of cell structures, and the regeneration limit test and the PM emission test were performed.

Figure 11:
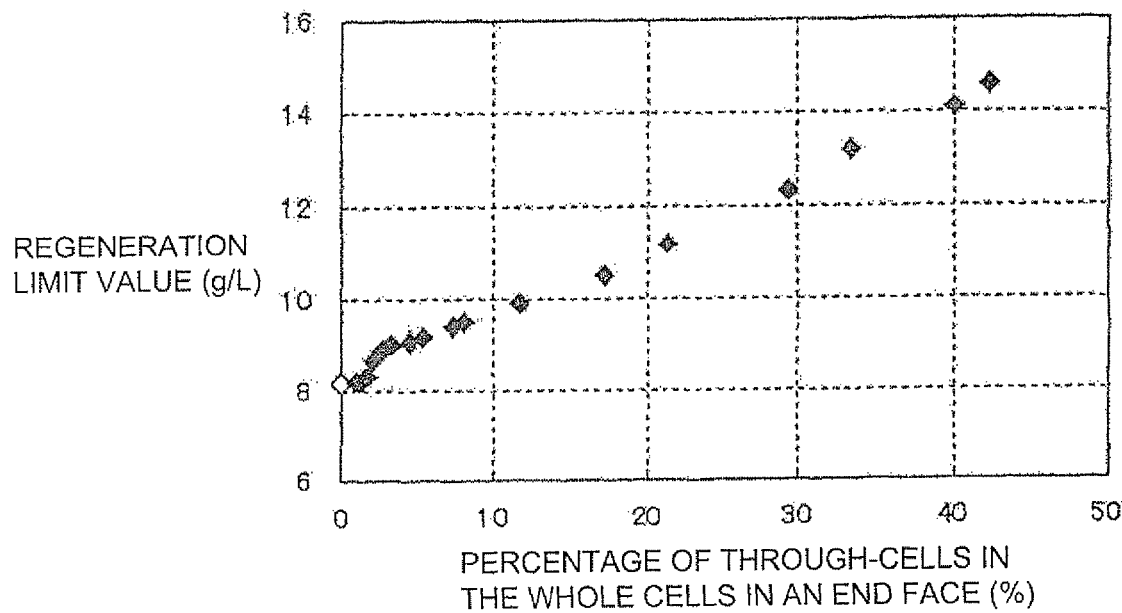
FIG. 11 is a schematic view showing a relation between the regeneration limit value and the percentage of through-cells in the whole cells in an end face.
Figure 12:
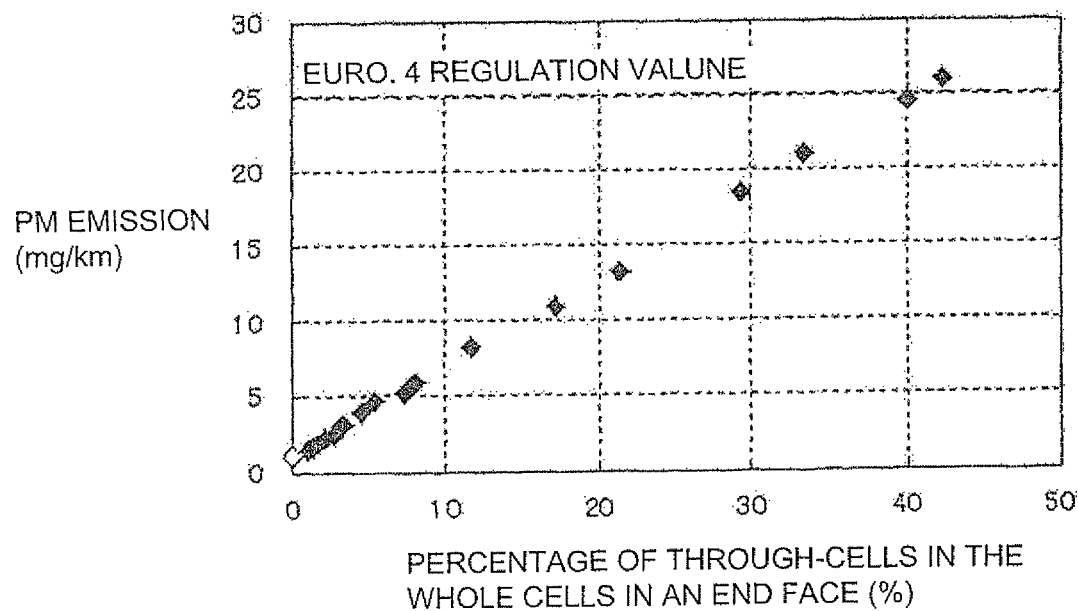
FIG. 12 is a schematic view showing a relation between the PM emission and the percentage of through-cells in the whole cells in an end face.

The results of the aforementioned tests are shown in Table 1, the relation between the regeneration limit value and the through-cell rate in the whole cells in an end face is shown in FIG. 11, and the relation between the PM emission and the through-cell rate in the whole cells in an end face is shown in FIG. 12.

TABLE 1

| No. | DPF size [mm] | Segment size [mm] | Segment disposition | Rib thickness [mm] | Cell pitch [mm] | Number of though-cell | Through-cell rate in whole cell in end face [%] | Regeneration limit value [g/L] | PM emission [mg/km] |
|---|---|---|---|---|---|---|---|---|---|
| Example 1 | φ144 × 142 | 36 × 36 | 4 × 4 segments | 0.31 | 1.47 | 3040 | 42.3 | 14.6 | 26.0 |
| Example 2 | φ144 × 142 | 36 × 36 | 4 × 4 segments | 0.31 | 1.47 | 2880 | 40.0 | 14.1 | 24.5 |
| Example 3 | φ144 × 142 | 36 × 36 | 4 × 4 segments | 0.31 | 1.47 | 2400 | 33.4 | 13.2 | 21.1 |
| Example 4 | φ144 × 142 | 36 × 36 | 4 × 4 segments | 0.31 | 1.47 | 2112 | 29.4 | 12.3 | 18.6 |
| Example 5 | φ144 × 142 | 36 × 36 | 4 × 4 segments | 0.31 | 1.47 | 1536 | 21.4 | 11.2 | 13.2 |
| Example 6 | φ144 × 142 | 36 × 36 | 4 × 4 segments | 0.31 | 1.47 | 1232 | 17.1 | 10.5 | 10.9 |
| Example 7 | φ144 × 142 | 36 × 36 | 4 × 4 segments | 0.31 | 1.47 | 832 | 11.6 | 9.9 | 8.2 |
| Example 8 | φ144 × 142 | 36 × 36 | 4 × 4 segments | 0.31 | 1.47 | 576 | 8.0 | 9.5 | 5.8 |
| Example 9 | φ144 × 142 | 36 × 36 | 4 × 4 segments | 0.31 | 1.47 | 528 | 7.3 | 9.4 | 5.2 |
| Example 10 | φ144 × 142 | 36 × 36 | 4 × 4 segments | 0.31 | 1.47 | 384 | 5.3 | 9.2 | 4.6 |
| Example 11 | φ144 × 142 | 36 × 36 | 4 × 4 segments | 0.31 | 1.47 | 320 | 4.4 | 9.1 | 3.9 |
| Example 12 | φ144 × 142 | 36 × 36 | 4 × 4 segments | 0.31 | 1.47 | 240 | 3.3 | 9.0 | 3.1 |
| Example 13 | φ144 × 142 | 36 × 36 | 4 × 4 segments | 0.31 | 1.47 | 200 | 2.3 | 8.9 | 2.5 |
| Example 14 | φ144 × 142 | 36 × 36 | 4 × 4 segments | 0.31 | 1.47 | 152 | 2.1 | 8.7 | 2.2 |
| Example 15 | φ144 × 142 | 36 × 36 | 4 × 4 segments | 0.31 | 1.47 | 128 | 1.8 | 8.3 | 1.9 |
| Example 16 | φ144 × 142 | 36 × 36 | 4 × 4 segments | 0.31 | 1.47 | 100 | 1.4 | 8.2 | 1.7 |
| Example 17 | φ144 × 142 | 36 × 36 | 4 × 4 segments | 0.31 | 1.47 | 80 | 1.1 | 8.2 | 1.5 |
| Comp. Ex. 1 | φ144 × 142 | 36 × 36 | 4 × 4 segments | 0.31 | 1.47 | 0 | 0.0 | 8.2 | 1.1 |
| Example 18 | φ144 × 142 | 36 × 36 | 4 × 4 segments | 0.38 | 1.80 | 2080 | 43.4 | 12.4 | 27.1 |
| Example 19 | φ144 × 142 | 36 × 36 | 4 × 4 segments | 0.38 | 1.80 | 1920 | 40.0 | 11.8 | 24.1 |
| Example 20 | φ144 × 142 | 36 × 36 | 4 × 4 segments | 0.38 | 1.80 | 960 | 20.0 | 10.0 | 14.5 |
| Example 21 | φ144 × 142 | 36 × 36 | 4 × 4 segments | 0.38 | 1.80 | 240 | 5.0 | 8.7 | 4.6 |
| Example 22 | φ144 × 142 | 36 × 36 | 4 × 4 segments | 0.38 | 1.80 | 192 | 4.0 | 8.5 | 4.1 |
| Example 23 | φ144 × 142 | 36 × 36 | 4 × 4 segments | 0.38 | 1.80 | 96 | 2.0 | 8.3 | 3.2 |
| Example 24 | φ144 × 142 | 36 × 36 | 4 × 4 segments | 0.38 | 1.80 | 80 | 1.7 | 8.0 | 2.6 |
| Example 25 | φ144 × 142 | 36 × 36 | 4 × 4 segments | 0.38 | 1.80 | 64 | 1.3 | 7.9 | 2.3 |
| Comp. Ex. 2 | φ144 × 142 | 36 × 36 | 4 × 4 segments | 0.38 | 1.80 | 0 | 0.0 | 7.9 | 1.1 |

(Discussion on the Results)

Regarding the regeneration limit test, as shown in Table 1, the regeneration limit was improved as the rate of the through-cells in the whole cell number in an end face is larger by cooling effect by the through-cell passage gas and the adjustment of the soot deposition distribution. When the rate of the through-cells was less than 2%, there was little cooling effect, and the soot deposition distribution was hardly changed, improvement of the regeneration limit cannot be seen. This proved that the lower limit of the through-cell rate was 2%.

(PM Emission Test)

Regarding the PM emission test, as shown in Tables 1 to 3, as the rate of the tough-cells in the whole cell number in an end face increased, the PM emission value became worse. When the rate of the though-cells exceeded than 40%, it was found out that the DPF is against the regulations because the PM emission exceeded 25 mg/km, which is the European emission regulation value. This proved that the upper limit of the through-cell rate was 40%.

INDUSTRIAL APPLICABILITY

The present invention can suitably be used as a method for manufacturing a honeycomb segment bonded article used as a trapping filter or the like of a DPF or the like.

The invention claimed is:

1. A ceramic filter comprising:
a plurality of honeycomb segments bonded to one another, the segments having been partitioned by porous partition walls, the porous partition walls forming a plurality of through channels that are configured to function as exhaust gas flow passages, each through channel having an inlet and an outlet and being formed in a longitudinal direction of each of the honeycomb segments, wherein: the plurality of through channels comprises:
a first type of through channels that are outflow holes, each being plugged at the inlet and open at the outlet;
a second type of through channels that are inflow holes, each being open at the inlet and plugged at the outlet; and
a third type of through channels that are through-cells, each being open at both the inlet and the outlet so that a fluid can pass through the inlet to the outlet, the third type of through channels being partially plugged at both ends.

2. A ceramic filter according to claim 1, wherein 2 to 40% of the through channels are the third type of through channels.

3. A ceramic filter according to claim 1, wherein the third type of through channels are formed in a large amount in a honeycomb segment disposed in a central portion of the ceramic filter.

4. A ceramic filter according to claim 1, wherein a honeycomb segment located in an inner peripheral portion contains more of the third type of through channels than honeycomb segments located in an outer peripheral portion of the ceramic filter.

5. A ceramic filter according to claim 1, wherein the third type of through channels are formed in a regular pattern.

6. A ceramic filter according to claim 1, wherein the third type of through channels are formed in an irregular pattern.

7. A ceramic filter according to claim 1, wherein each of the honeycomb segments further comprises:
a fourth type of through channel that is plugged at both ends.

8. A ceramic filter according to claim 1, wherein a cross-sectional area of the third type of through channel openings is 20 to 100% of a cross-sectional area of the other types of through channels.

9. A ceramic filter according to claim 1, wherein the through channels are formed so that a cross-sectional shape on an inlet side is different from a cross-sectional shape on an outlet side.

10. A ceramic filter according to claim 9, wherein the cross-sectional shape on the inlet side of the through channel is octagonal, and the cross-sectional shape on the outlet side of the through channel is quadrangular.

11. A ceramic filter according to claim 1, wherein the through channels are plugged in a checkerwise pattern, and the third type of through channels constitute a part of the checkerwise pattern.

12. A ceramic filter according to claim 11, wherein through channels that are plugged at both ends are part of the checkerwise pattern.

13. A method for manufacturing the ceramic filter of claim 1, the method comprising:
   applying a film on one end of the ceramic filter;
   projecting a laser onto the film to form holes in the film; and
   stuffing a plugging paste through the holes to form plugged ends of the through channels,
   wherein the laser forms the holes at locations that correspond to the through channels that are not the third type of through channels.

14. A method according to claim 13, wherein the holes are formed in a checkerwise pattern, and the laser forms the holes only at locations corresponding to plugged portions of the through channels.

15. A method for manufacturing the ceramic filter of claim 1, comprising:
   forming the third type of through channels by forming through-holes in the plugged ends of the through channels after the plugged ends are formed.

16. A method according to claim 15, wherein the plugged ends are formed in a checkerwise pattern.

17. A method for manufacturing the ceramic filter of claim 1, comprising:
   forming the third type of through channels by boring a part of the plugged ends of the through channels after the plugged ends are formed.

18. A method according to claim 17, wherein the plugged ends are formed in a checkerwise pattern.

* * * * *